United States Patent
Kim et al.

(10) Patent No.: US 12,292,517 B2
(45) Date of Patent: May 6, 2025

(54) METHOD AND SYSTEM FOR POSITION ESTIMATION USING DOMAIN ADAPTATION

(71) Applicant: Mitsubishi Electric Research Laboratories, Inc., Cambridge, MA (US)

(72) Inventors: Kyeong-Jin Kim, Cambridge, MA (US); Remy Zawislak, Cambridge, AL (US); Karl Berntorp, Cambridge, MA (US); Marcus Greiff, Cambridge, AL (US); Stefano Di Calrano, Cambridge, MA (US); Kieran Parsons, Cambridge, AL (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 324 days.

(21) Appl. No.: 17/929,967

(22) Filed: Sep. 6, 2022

(65) Prior Publication Data

US 2024/0077622 A1   Mar. 7, 2024

(51) Int. Cl.
*G01S 19/22* (2010.01)
*G01S 19/37* (2010.01)
*G06N 3/08* (2023.01)

(52) U.S. Cl.
CPC ............ *G01S 19/22* (2013.01); *G01S 19/37* (2013.01); *G06N 3/08* (2013.01)

(58) Field of Classification Search
CPC ............ G01S 19/22; G01S 19/37; G06N 3/08

USPC ....................................................... 342/357.61
See application file for complete search history.

(56) References Cited

U.S. PATENT DOCUMENTS

| | | | |
|---|---|---|---|
| 1,104,216 A1 | 6/2021 | Nvidia | |
| 11,113,567 B1 | 9/2021 | Durand et al. | |
| 12,061,275 B2 * | 8/2024 | van Diggelen | G01S 19/425 |
| 2019/0339083 A1 | 11/2019 | Ewert | |
| 2021/0173095 A1 | 6/2021 | Kang | |
| 2021/0264213 A1 | 8/2021 | Pandey et al. | |

(Continued)

FOREIGN PATENT DOCUMENTS

| | | | | |
|---|---|---|---|---|
| EP | 3505964 A1 * | 7/2019 | ............ | G01S 19/07 |
| WO | WO-2022128588 A2 * | 6/2022 | ........... | G01S 5/0273 |

*Primary Examiner* — Harry K Liu
(74) *Attorney, Agent, or Firm* — Gene Vinokur

(57) ABSTRACT

Embodiments of the present disclosure disclose a method and a system for tracking the position of the one or more moving objects. The method includes collecting GNSS measurement data of satellite signals transmitted from multiple satellites. The method further includes extracting values of a plurality of features from the GNSS measurement data. The method includes mapping the extracted values of the plurality of features to a source domain. The method includes classifying the mapped transformed plurality of features using a neural network. The neural network is trained over simulated data sampled from a source domain. The method includes identifying multipath measurements of the GNSS measurement data based on classification of the corresponding mapped transformed plurality of features. The method includes tracking the position of the one or more moving objects by processing identification of GNSS measurement data affected by multipath.

20 Claims, 19 Drawing Sheets

(56) References Cited

U.S. PATENT DOCUMENTS

2023/0057518 A1* 2/2023 Chen .................. H04B 7/18556
2023/0417855 A1* 12/2023 Peng .................... G01S 5/0218

\* cited by examiner

METHOD AND SYSTEM FOR POSITION ESTIMATION USING DOMAIN ADAPTATION

TECHNICAL FIELD

The present disclosure relates generally to a Global Navigation Satellite System (GNSS), and more specifically to a method and system for position estimation under the multipath transmission from at least some satellite signals.

BACKGROUND

Global Navigation Satellite Systems (GNSSs), including the GPS, GLONASS, Galileo, or BeiDou system, are used in many applications. The GNSS is a satellite navigation system that provides location and time information with line-of-sight (LOS) to a set of satellites. In an urban environment, reflection and refraction of the LOS satellite signals can lead to multipath transmission affecting the accuracy of position estimation.

Conventional GNSS receiving systems or receivers use temporal and spatial diversity to minimize problems with multipath of the satellite signals. The temporal methods use differences in time delays between the multipath signals and the LOS signal. However, those methods are computationally complex and ineffective when the delays of the multipath signals are short. The spatial methods use multiple antennas for multipath detection and mitigation. For example, the method described in U.S. Pat. No. 7,642,957 uses two antennas to receive a signal where it is assumed that at least one antenna receives a "good" signal resulting from constructively interfered signals. However, the constructive interference of satellite signals cannot be guaranteed, and all antennas of such a GNSS receiving system can be subject to the same multipath degradation.

Another common approach is to use an elevation mask, in which the receiver selects an active set of satellites with the highest elevation angles. While very high or low elevations can be signs of the presence or absence of multipath, such elevation masking works poorly in obstructed areas, such as urban environments.

In recent years, model-free or data-driven machine learning (ML) techniques that do not require knowing the parametric model have led to improvements in a wide range of applications. In particular, the ability of ML techniques to learn complex hidden models from data has proven quite successful, quickly surpassing most state-of-the-art human-designed algorithms.

The ML is also useful for position estimation performed by GNSS receiving systems. For example, the hidden model of multipath and non-line-of-sight (NLOS) signals can be learned to improve position estimation. However, the ML-based multipath and NLOS detection for position estimation in GNSS receiving systems has several challenges including one or a combination of (1) lack of training data; (2) unclearness in data representation; (3) no common model for multipath and NLOS signal reception; and (4) the need for adjusting an architecture of a neural network for GNSS receiving system needs.

Accordingly, there is a need to configure ML for position estimation in Global Navigation Satellite System (GNSS)-based positioning devices.

SUMMARY

It is an object of some embodiments to provide a Global Navigation Satellite System-based positioning device (GNSS-based positioning device) performing position estimation using neural networks. Additionally or alternatively, it is an objective of some embodiments to provide ML-based multipath and non-line-of-sight (NLOS) detection for position estimation in GNSS. However, supervised ML-based multipath and NLOS detection requires labeled data for learning. The creation of a large amount of labeled data would require extensive and time-consuming efforts and might be subject to experimentation and labeling errors. Specifically, considering the variability of actual data due to environments, dynamics, and physical constraints on the receivers providing labeled data for all position estimation scenarios is impractical.

Some embodiments are based on a recognition that while the availability of labeled GNSS data for an actual position of a moving object in a target domain is unavailable or at least limited, the labeled GNSS data in other domains may be available. As used herein, a domain governed by at least a current position with respect to the multiple satellites and an environment surrounding a moving object in the current position is referred herein as a target domain. The GNSS measurement data collected within the target domain has a statistical distribution in the target domain of multipath and/or non-line-of-sight (NLOS) signals governed, for example, by urban architecture and infrastructure and the position of the satellites used for collecting GNSS measurement data. Such statistical distribution in the target domain is also interchangeably referred to herein as a target distribution.

The other domains that have different GNSS measurement data distributions are referred to herein as the source domain. The labeled GNSS data used for ML can come from different types of source domains, including actual GNSS data having other than target distribution, e.g., collected in different localities, and/or simulated GNSS data. The source domain can have full or partial knowledge for the GNSS signals of non-line-of-sight (NLOS) and multipath. To that end, the target domain data resembles real data associated with real GNSS measurements collected in a real or current environment, while the source domain represents a simulation of the real domain. Thus, the source domain data is a type of simulated data.

Some embodiments are based on realization that there may be challenges associated with using the simulated data, such as simulated data might not be an accurate representation of the real data, considering the variability of actual data due to environments, dynamics, and physical constraints on GNSS receivers. To that end, training an ML model in a source domain (e.g., on simulated data) and applying it to perform predictions and tracking in a target domain (e.g., on real data) may encounter performance-related challenges, which need to be overcome.

To this end some embodiments provide a domain adaptation from the target domain to the source domain, of GNSS measurement data, to use ML-based approach for classification of GNSS measurement data. Some embodiments use a Generative Adversarial Network (GAN) architecture model for domain adaptation, and specifically a cycle-consistent GAN (CGAN) architecture. The domain adaptation is then used to train the ML model to identify multipath measurement from the GNSS measurement, and further to perform accurate tracking of one or more moving objects in the real environment of GNSS.

Accordingly, one embodiment discloses a computer-implemented method for tracking the position of one or more moving objects. The method uses a processor coupled with stored instructions implementing the method. The instructions when executed by the processor conduct steps of the method. The method includes collecting GNSS measurement data of satellite signals transmitted from multiple satellites. The GNSS measurement data is collected during motion or navigation of the one or more moving objects in a target domain. The method further includes extracting values of a plurality of features from the GNSS measurement data. The plurality of features includes one or a combination of: features derived from code and phase measurements, carrier-to-noise-power-density-ratio, and Doppler shifts. The method includes mapping the extracted values of the plurality of features from the target domain to a source domain, wherein the mapped values of the plurality of features have a statistical distribution in the target domain that resembles statistical distribution of training data used to train a classifier in the source domain. The method includes classifying the mapped values of the plurality of features using a neural network, wherein the neural network is trained over the training data sampled from the source domain. Based on the classification of the corresponding mapped values of the plurality of features, the GNSS measurement data that is affected by multipath are identified. Further, the method includes tracking the position of the one or more moving objects by processing the identified GNSS measurement data affected by multipath. The plurality of features comprises one or a combination of values of: carrier-to-noise-power-density-ratio ($C/N_0$) variation over time, code-minus-carrier (CMC) values, and values of Doppler rate consistency (DRC), and at least first and second derivatives of these plurality of features, relative satellite elevation and estimator integer fixation estimates.

In some embodiments, mapping of the extracted values of the plurality of features is performed using a cycle-consistent Generative Adversarial Network (CGAN). Some embodiments are based on recognition that CG-AN can be used for image-to-image translation of images, e.g., translate images of horses into images of zebra and vice versa. However, some embodiments appreciate that the features extracted from the GNSS measurement data can be treated as images and thus the CGAN can be used for the domain adaptation of these features. To that end, some embodiments map the extracted values of the plurality of features using a CGAN performing an image-to-image translation of images formed by the extracted values of a plurality of features and images formed by training features used for training the neural network. Examples of the features advantageous for such mapping include but not limited to features indicative of carrier-to-noise-power-density-ratio ($C/N_0$) variation over time, code-minus-carrier (CMC) values, and Doppler rate consistency (DRC).

Another embodiment discloses that the position of the one or more moving objects is tracked using a position estimator, wherein the position estimator is a probabilistic filter that is configured to determine the position of the one or more moving objects based on the identification of the GNSS measurement data as either of affected or not affected by multipath.

Some embodiments disclose that the position estimator is a probabilistic filter that is configured to determine the position of the one or more moving objects based on the identification of the GNSS measurement data as either of affected or not affected by multipath. In some embodiments, the probabilistic filter is a mixed-integer Kalman filter that computes the estimate of receiver states conditioned on the GNSS measurement data that are identified to be not affected by multipath.

Some embodiments disclose that the neural network is trained using a CNN-auto-encoder (CNN-AE) with K-means clustering to classify the mapped plurality of features of the GNSS measurement data, wherein the mapped plurality of features are classified as either one of inlier measurements and outlier measurements, wherein the K-means clustering distinguishes between the inlier measurements and the outlier measurements.

Another embodiment discloses that the neural network is pre-trained offline and updated online during tracking of the position of the one or more moving objects using the extracted values of the plurality of features of the GNSS measurement data.

According to another embodiment, a positioning device for tracking the position of one or more moving objects is provided. The positioning device comprises a processor; and a memory having instructions stored thereon that, when executed by the processor, cause the GNSS to: collect GNSS measurement data of satellite signals transmitted from multiple satellites, wherein the GNSS measurement data are collected during motion of the one or more moving objects in a target domain (defined by environment); extract values of a plurality of features from the GNSS measurement data, wherein the plurality of features includes one or a combination of: features derived from code and phase measurements, carrier-to-noise-power-density-ratio and Doppler shifts; map the extracted values of the plurality of features from the target domain to a source domain, wherein the mapped values of the plurality of features have a statistical distribution in the target domain that resembles statistical distribution of training data used to train a classifier in the source domain; classify the mapped values of the plurality of features using a neural network, wherein the neural network is trained over the training data sampled from the source domain; identify GNSS measurement data that are affected by multipath based on the classification of the mapped values of the plurality of features; and track the position of the one or more moving objects by on processing the identified GNSS measurement data affected by multipath.

According to yet another embodiment, a non-transitory computer readable storage medium having embodied thereon a program executable by a processor for performing a method for tracking the position of one or more moving objects is provided. The method comprising: collecting GNSS measurement data of satellite signals transmitted from multiple satellites, wherein the GNSS measurement data are collected during motion of the one or more moving objects in a target domain; extracting values of a plurality of features from the GNSS measurement data, wherein the plurality of features includes one or a combination of: features derived from code and phase measurements, carrier-to-noise-power-density-ratio and Doppler shifts; mapping the extracted values of the plurality of features from the target domain to a source domain, wherein the mapped values of the plurality of features have a statistical distribution in the target domain that resembles statistical distribution of training data used to train a classifier in the source domain; classifying the mapped values of the plurality of features using a neural network, wherein the neural network is trained over the training data sampled from the source domain; identifying GNSS measurement data that are affected by multipath based on classification of the corresponding mapped values of the plurality of features; and tracking the position of the one or more moving objects by processing the GNSS measurement data affected by multipath.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example", "for instance", and "such as", and the verbs "comprising", "having", "including", and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect. The GNSS receiver is also recognized as the GNSS system by some embodiments.

Figure 1:
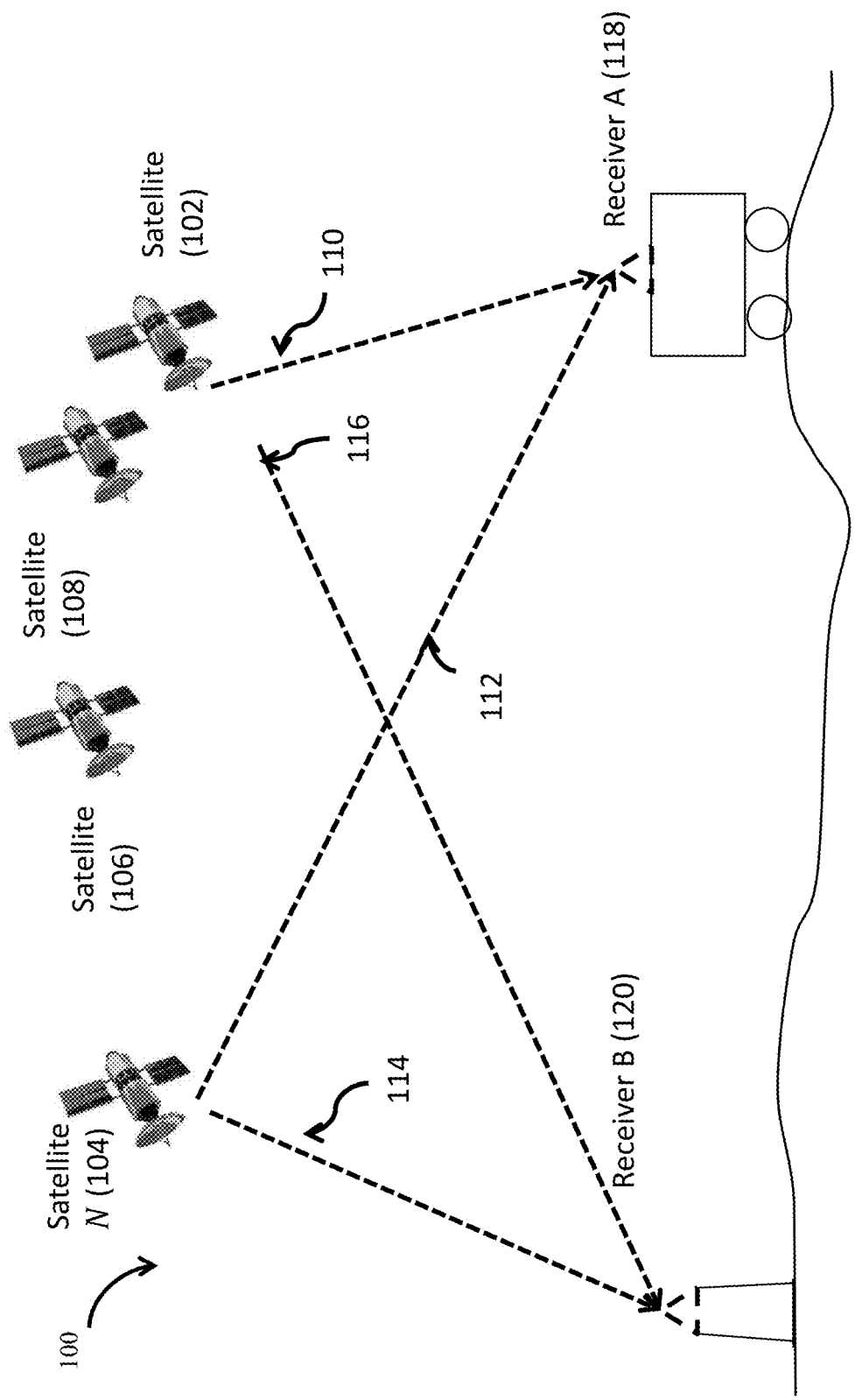
FIG. 1 illustrates an environment for a positioning device, according to an embodiment of the present disclosure.

FIG. 1 shows an environment 100 for a positioning device according to some embodiments. For instance, an Nth satellite 104 transmits a signal 112 and a signal 114 which include code and carrier phase measurements, to a set of receivers 118 and 120. For example, the receiver 118 is positioned to receive signals 110, 112, from N satellites 102, 104, 106, and 108. Similarly, the receiver 120 is positioned to receive signals 114 and 116 from the N satellites 102, 104, 106, and 108.

In various embodiments, the receiver 118 and 120 can be of different types. For example, in exemplar embodiment of FIG. 1, the receiver 120 is a base receiver, whose position is known. In one example, the receiver 120 corresponds to a receiver mounted on the ground. In contrast, the receiver 118 is a mobile receiver configured to move. In another example, the receiver 118 is mounted in a cell phone, a car, or a train. In some implementations, the second receiver 120 is optional and is used to remove uncertainties and errors due to various sources, such as atmospheric effects and errors in the internal clocks of the receivers and satellites. Thus, at least one of the sets of receivers 118 and 120 may be associated with one or more moving objects.

The one or more receivers, 118 and 120, are configured to receive GNSS data from the one or more of the N satellites 102, 104, 106, and 108 in the form of signals, such as the signals 110, 112, 114 and 116. Generally, for tracking the position of the one or more moving objects associated with the one or more receivers 118 and 120, availability of labeled GNSS data is required. The GNSS measurement data of the signals 110 and 112 transmitted from the N satellites 102, 104, 106, and 108 is collected during a motion or a navigation of the one or more moving objects in a target domain. Some embodiments are based on recognition that while the availability of labeled GNSS data for an actual position of a moving object in the target domain is unavailable or at least limited, the labeled GNSS data in other domains, such as a source domain may be available. As used herein, a domain governed by at least a current position with respect to the multiple satellites and the environment 100 surrounding the moving object in the current position is referred herein as the target domain. The GNSS measurement data collected within the target domain has a statistical distribution in the target domain of multipath and/or non-line-of-sight (NLOS) signals governed, for example, by urban architecture and infrastructure and the position of the satellites used for collecting such GNSS measurement data. Such statistical distribution in the target domain is also interchangeably referred to herein as a target distribution. The GNSS measurement data collected in the target domain represents the real GNSS measurement data.

The statistical distribution of the GNSS measurement data collected in the target domain affects the statistical distribution of the features extracted from the collected GNSS measurement data. Example of the statistical distribution can be joint distribution of different features extracted from the collected GNSS measurement data. For example, the values of a plurality of features extracted from the GNSS measurement data can be indicative of one or a combination of code and phase values, carrier-to-noise-power-density-ratio, and Doppler shifts of the satellite signals collected in the target domain, such that a statistical distribution of the extracted values of the plurality of features is governed by the target domain.

The other domains that have different GNSS measurement data distributions are referred to herein as the source domain. The labeled GNSS data can come from different types of source domains, including actual GNSS data having other than target distribution, e.g., collected in different localities, and/or simulated GNSS data. The source domain can have full or partial knowledge for the GNSS signals of non-line-of-sight (NLOS) and multipath. To that end, the target domain data resembles real data associated with real GNSS measurement data collected in a real or current environment, while the source domain represents a simulation of the real domain. On the other hand, the source domain data can be simulated data. The simulated data is advantageous for training a neural network to classify multipath in GNSS measurement data. However, such trained neural network may not be accurate for processing GNSS measurement data collected in real time due to the difference in statistical properties of the data in the source and the target domains.

Accordingly, there may be challenges associated with using the simulated data, such as simulated data might not be an accurate representation of the real data, considering the variability of actual data due to environments, dynamics, and physical constraints on GNSS receivers. To that end, training an ML model in the source domain (e.g., on simulated data) and applying it to perform predictions and tracking in the target domain (e.g., on real data) may encounter performance-related challenges, which need to be overcome.

To this end some embodiments provide a domain adaptation from the target domain to the source domain, of the GNSS measurement data, to use ML-based approach for classification of the GNSS measurement data. The GNSS measurement data is received in the form of signals, such as the signals 110-116, which have different characteristics. For example, random noise characteristics. These random noise characteristics of carrier phase and code signals are described by a probability density function (PDF) with prior determined parameters, such as a variance of the PDF. That is, the PDF relating the measurements to the position of the receiver 118, 120 and the integer ambiguities are used to determine the range of ambiguities, which results in a finite number of possible integer values.

Other embodiments are based on realization that the finite number of possible integer values of carrier phase ambiguity allows to evaluate all the possible integer values for tracking the position of the receiver 118, 120. Such a realization allows to replace the evaluation of the carrier phase ambiguity with the evaluation of a position of the receiver 118, 120 determined using the carrier phase ambiguity. This replacement is advantageous, because the probabilistic nature of the motion of the receiver 118, 120 is better equipped to assess the position than to assess derivative of the position, such as the carrier phase ambiguity.

To that end, the positioning device associated with environment 100 can be used to track the position of the one or more moving objects in target domain, based on the characteristics of the signals received by the one or more receivers, 110 and 120.

Specifically, the positioning device depicted by the environment 100 may be used to implement an ML model which is trained on simulated data of the source domain, to be used with real data of the target domain, where the target domain is different from the source domain. In this regard, one important consideration for the ML model is to keep some relevant information from the source domain, such as multipath information of signal characteristics, conserved during prediction of position of the one or more moving objects by the ML model. The signal characteristics represent GNSS measurement data received by the one or more receivers, 110 and 112. The positioning device is further explained in FIG. 2A.

Figure 2A:
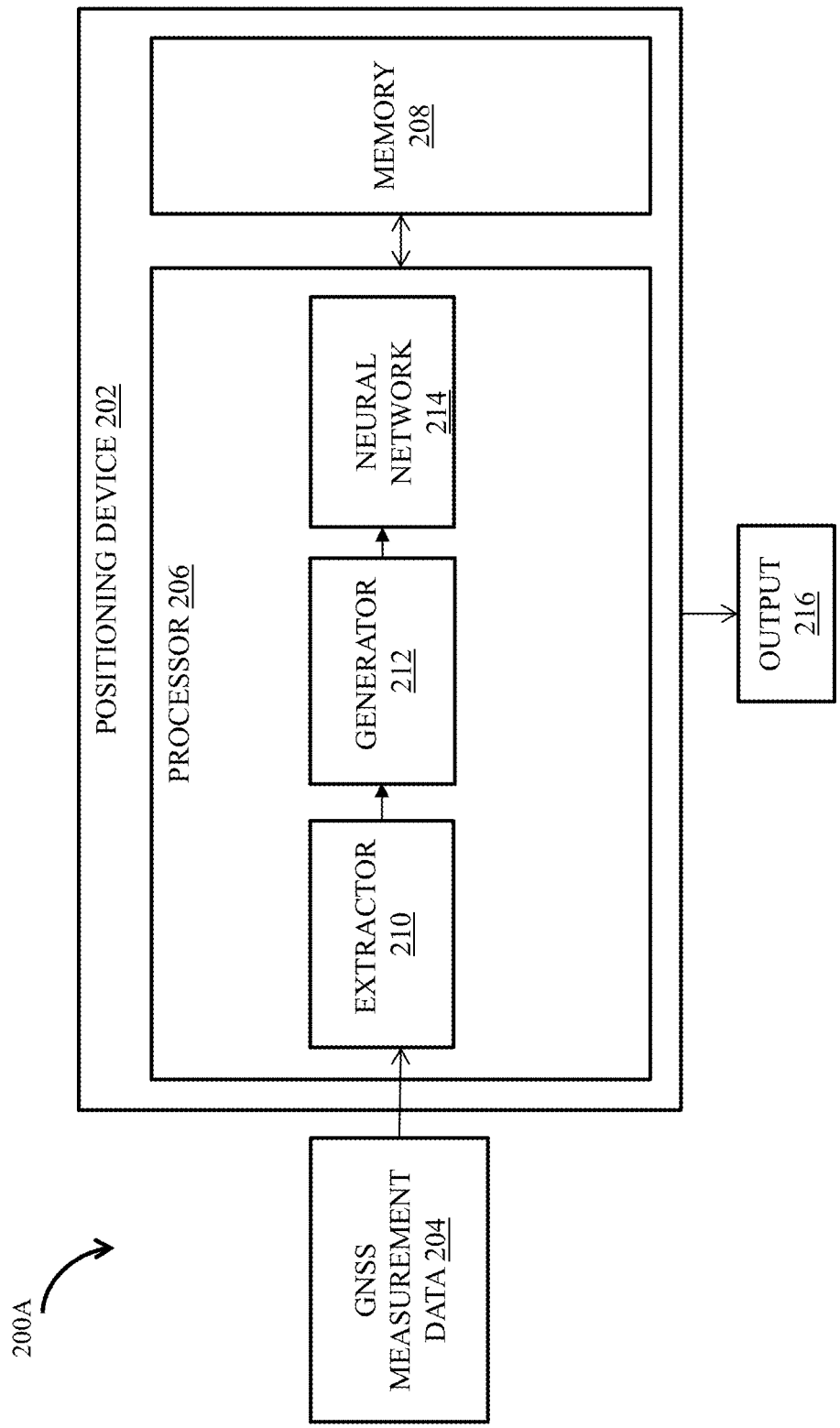
FIG. 2A illustrates a schematic block diagram of the positioning device, according to an embodiment of the present disclosure.

FIG. 2A illustrates a schematic block diagram 200A of a positioning device 202, according to an embodiment of the present disclosure. The positioning device 202 includes a processor 206 and a memory 208. The processor 206 includes an extractor 210, a generator 212, and a neural network 214. The positioning device 202 is a GNSS-based positioning device (Global Navigation Satellite System-based positioning device).

In some embodiments, examples of the processor 206 include, but are not limited to, an application-specific integrated circuit (ASIC) processor, a reduced instruction set computing (RISC) processor, a complex instruction set computing (CISC) processor, graphical processing unit (GPU), a field-programmable gate array (FPGA), and the like. In some embodiments, the memory 208 includes suitable logic, circuitry, and/or interfaces to store a set of computer-readable instructions for performing operations. Additionally, examples of the memory 208 may include a random-access memory (RAM), a read-only memory (ROM), a removable storage drive, a hard disk drive (HDD), and the like. It will be apparent to a person skilled in the art that the scope of the disclosure is not limited to realizing the memory 208 in the positioning device 202, as described herein.

The memory 208 stores instructions to be executed by the processor 206. The processor 206 is configured to execute the stored instructions to cause the positioning device 202 to collect GNSS measurement data 204 of satellite signals transmitted from multiple satellites. The mutliple satellites corresponds to the N satellites 102, 104, 106, and 108 of FIG. 1. The GNSS measurement data 204 is collected during navigation of one or more moving objects in the target domain. The GNSS measurement data 204 includes but may not be limited to at least one of signals formed in code and phase measurements, carrier-to-noise-power-density-ratio and Dopple shifts.

Further, the extractor 210 is configured to extract values of a plurality of features from the GNSS measurement data 204. The plurality of features includes one or a combination of: features derived from code and phase measurements, carrier-to-noise-power-density-ratio, Doppler shifts, and the like. Furthermore, the extracted values of the plurality of features from the target domain to the source domain are mapped with facilitation of the generator 212. The generator 212 is described in detail with reference to FIG. 3A, FIG. 33 and FIG. 3C.

The mapped values of the plurality of features provided by the generator 212 have a statistical distribution in the target domain that resembles statistical distribution of training data used to train the neural network 214 in the source domain. The neural network 214 is utilized to classify the mapped values of the plurality of features of the GNSS measurement data 204.

The GNSS measurement data 204 are mapped and transformed from the target domain to the source domain using the neural network 214. The neural network 214 is trained using simulated data having a source distribution of the plurality of features in the source domain different from the target distribution of the plurality of features in the target domain. The neural network 214 is at least pre-trained offline using unbalanced supervised learning with instances of the trained simulated data having the source distribution and instances of labeled simulated data having the target distribution. The neural network 214 is trained using the generator 212. In an embodiment, the generator 212 may be a Cycle-consistent Generative Adversarial Network. In general, the Cycle-consistent Generative Adversarial Network, or CGAN, is an approach to training a deep convolutional neural network for domain-to-domain translation tasks (explained further in detail in FIG. 3A). The neural network 214 learns mapping between input and output features using unpaired dataset. In an embodiment of the present disclosure, the mapped values of the plurality of features of the GNSS measurement data 204 are generated using the neural network 214.

Furthermore, the positioning device 202 classifies the mapped plurality of features 212 using the neural network 214. The neural network 214 is trained on the simulated data sampled from the source domain. The neural network 214 includes a classifier 220 (shown in FIG. 2B). The classifier 220 is trained to classify the mapped values of the plurality of features 212 as either one of inlier measurements or outlier measurements.

Based on the classification of the mapped values of the plurality of features, the positioning device 202 identifies GNSS measurement data that are affected by multipath. Furthermore, the positioning device 202 performs tracking of the position of the one or more moving objects in the target domain by processing the GNSS measurements affected by multipath.

To that end, based on the classification of the mapped values of the plurality of features, the positioning device 202 is configured to identify GNSS measurement data that are affected by multipath. As is known, data are affected by multipath related interference noise when a transmitted signal reaches a receiver by more than one path. Such interference can affect the quality of the GNSS measurement data, which in turn affects accuracy of tracking of an object using this GNSS measurement data affected by multipath. Thus, the positioning device 202 is configured to track the position of the one or more moving objects by processing the identified GNSS measurement data affected by multipath and an output 216 is generated according to this identification. The positioning device 202 is further configured to control motion of the one or more moving Objects based on the tracked position of the one or more moving objects.

In some embodiments, the GNSS measurement data identified to be affected by multipath are removed from GNSS measurement data to be used for tracking of the one or more moving objects. To track the position of the one or more moving objects, some embodiments disclose, a position estimator, as will be described next in FIG. 2B.

Figure 2B:
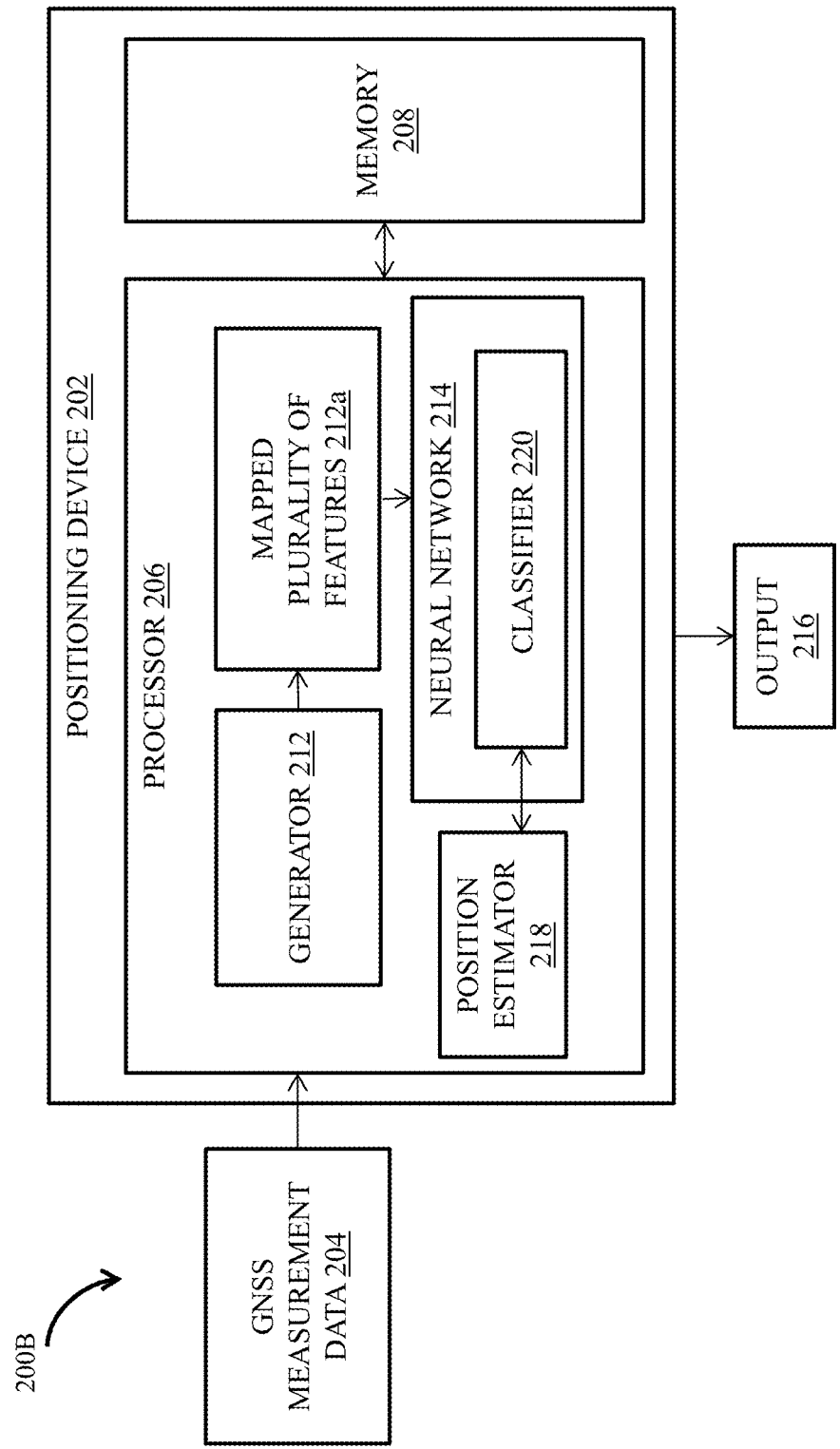
FIG. 2B illustrates an exemplar block diagram of the positioning device including a position estimator, according to an embodiment of the present disclosure.

FIG. 2B illustrates an exemplar block diagram of the positioning device 202 including a position estimator 218, according to an embodiment of the present disclosure. The processor 206 includes the generator 212, which provides the mapped plurality of features 212a and the neural network 214 which further includes the classifier 220. The classifier 220 is configured to classify the GNSS measurement 204 in a presence of noise as either one or inlier measurements or clean measurements, i.e., measurements free of multipath and have line-of-sight (LOS) transmission, and outlier measurements, i.e., measurements corrupted by biases and non-line-of-sight (NLOS) transmission. As one exemple, a recurrent neural network is employed as the position estimator 218.

The position of the one or more moving objects is tracked using the position estimator 218 considering a probability of the GNSS measurement data being affected by multipath based on the classification of the corresponding mapped plurality of features 212a. In some embodiments, the neural network 214 utilizes the classifier 220, which is trained to separate the outlier measurements from the inlier measurements, which is to determine which measurements to include or exclude in the position estimator 218. The GNSS measurement data in a presence of noise caused by a multipath and non-line-of-sight (NLOS) transmission of at least some of the satellite signals at some instances of time are herein referred to as outlier measurements. In some embodiments, the classifier 220 is trained in the source domain to classify the mapped plurality of features 212a as inlier measurements or outlier measurements.

Some embodiments are based on the understanding that the neural network 214 can directly output the position of at least one moving object based on the GNSS measurements identified as multipath GNSS measurements. To this end, in some embodiments, the neural network 214, in combination with the position estimator 218, which is a recurrent neural network trained to determine the position of the one or more moving objects from the GNSS measurement data are used. The recurrent neural network uses an attention-based multimodal fusion that applies different weights to at least some different GNSS measurements to estimate the position of the moving object from the weighted GNSS measurements. The position estimator 218 prunes the outlier measurements in the target domain to produce clean measurements in the target domain and to estimate the position of the one or more moving objects based on the clean, also referred to as inlier, measurements in the target domain. Further, the tracked position of the one or more moving objects is generated as the output 216.

In some embodiments, the position estimator 218 estimates the position of the one or more moving objects based on a probability of the GNSS measurement data being affected by multipath based on the classification of the corresponding mapped plurality of features. To that end the position estimator is a probabilistic filter that is configured to determine the position of the one or more moving objects based on the identification of the GNSS measurement data as either affected or not affected by multipath. For example, the position estimator 218 may be the probabilistic filter that comprises a mixed-integer Kalman filter that computes an estimate of receiver states conditioned on the GNSS measurement data that are identified to be not affected by multipath. This will be further discussed in conjunction with FIG. 5.

To that end, to accurately track the position of the one or more moving objects, some features of the GNSS measurement data are more suited as compared to other features, which will be described next in FIG. 2C.

Figure 2C:
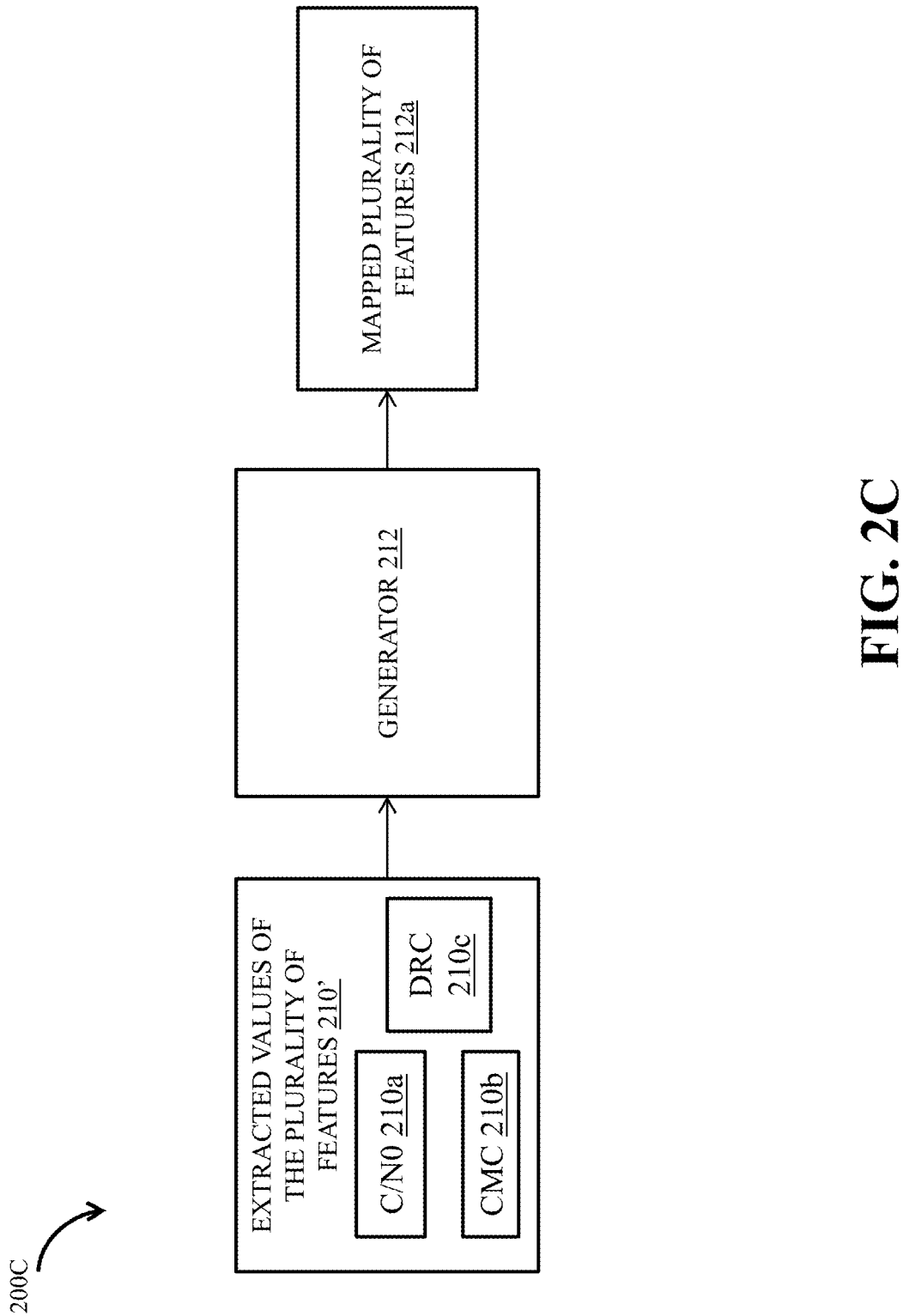
FIG. 2C illustrates a block diagram of mapping extracted values of a plurality of features, according to an embodiment of the present disclosure.

FIG. 2C illustrates a block diagram 200C of mapping extracted values of the plurality of features of the GNSS measurement data, according to an embodiment of the present disclosure. The extracted values of plurality of features 210' include but may not be limited to values of carrier-to-noise-power-density-ratio ($C/N_0$) variation over time 210a, code-minus-carrier (CMC) values 210b, and values of Doppler rate consistency (DRC) 210c (as shown in FIG. 2C). In general, $C/N_0$ 210a exhibits special behavior under multipath or for NLOS signals. A common technique of detecting multipath is to evaluate the $C/N_0$ 210a relative to a threshold. Considering that $C/N_0$ can take a wide range of values even for pure LOS signals, a more advanced solution is to evaluate the $C/N_0$ in 210a relation to its expected value modeled as a nonlinear function in the satellite elevation. This requires tuning, and the $C/N_0$ 210a of unhealthy satellites might be high in some situations. Thus, the positioning device 202 utilizes successive Receiver Independent Exchange Format (RINEX) measurements, which constitute the GNSS measurement data. or other types of measurements over the time window W to capture the evolution of the $C/N_0$ 210a. As the instantaneous or mean values of the $C/N_0$ 210a provide false information, the values are centered to only focus on the variations.

In general, CMC 210b is used as a feature. At time epoch t, the $i^{th}$ CMC for the $i^{th}$ satellite is defined as $CMC_t^i = \rho_t^i - \lambda\phi_t^i \approx 2I_k^i + \lambda N_t^i + m_t^i + \varepsilon$, where $\rho_t^i$ and $\phi_t^i$ denote the pseudorange and carrier phase measurement received at time epoch t for the ith satellite; $\lambda$ is the signal wavelength; $I_k^i$ is the ionospheric delay; $N_t^i$ is the integer ambiguity; $m_t^i$ is the multipath bias; and $\varepsilon$ is the measurement noise. Although carrier phase multipath is negligible in general compared to pseudorange multipath, $m_t^i$ includes multipath experienced by the pseudorange and carrier phase measurements. To simplify the analysis, it is assumed that the measurement noise is independent of the satellite and time epoch, whereas ionospheric delay, integer ambiguity, and multipath bias are related to the satellite and time dependent. The presence of the multipath bias without geometry dependence is an indicator of the potential usefulness of this feature. As the integer ambiguity can take high values but remains largely constant over time, the CMC 210b is centered over the time window.

Furthermore, the DRC 210c is an effective feature for multipath and NLOS detection, since multipath often impacts differently Doppler shifts and pseudorange measurements. The DRC 210c is defined as: $DRC_t^i \triangleq (\rho_t^i - \rho_{t-1}^i) - c(f_{d,t}^i/f_{L_1})\Delta t|$, where $f_{d,t}^i$ denotes the Doppler shift caused by a receiver-satellite relative motion, with c and $f_{L_1}$ respectively denoting the speed of light and $L_1$ carrier frequency, and $\Delta t$ the duration between two measurements.

The extracted values of each of these features, $C/N_0$ 210a, CMC 210b, and DRC 210c are mapped using the generator 212 to the mapped values of the plurality of features 212a as described in detail FIG. 3A, FIG. 3B, and FIG. 3C below.

Figure 3A:
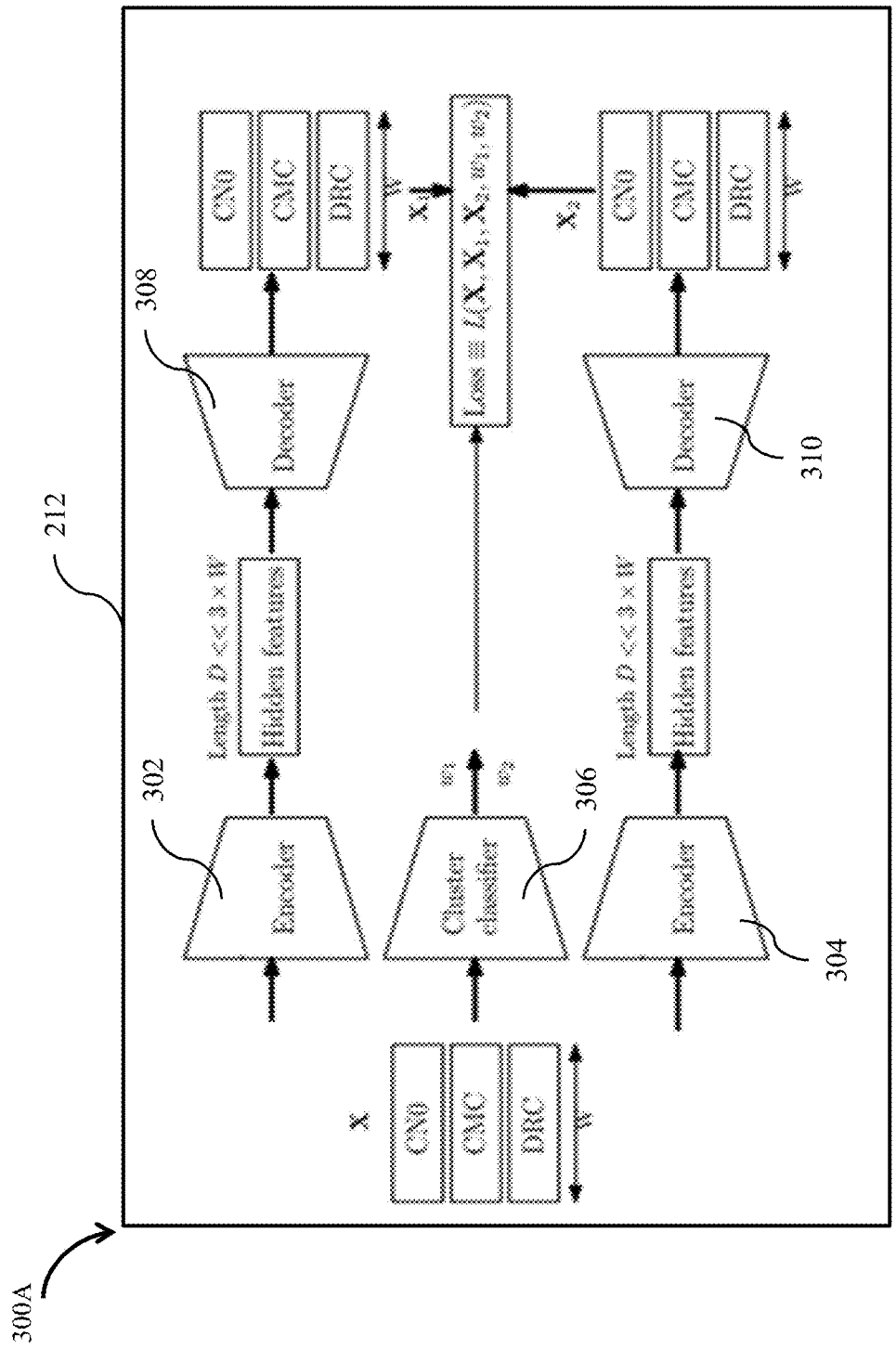
FIG. 3A illustrates an exemplar block diagram of a generator used for mapping the GNSS measurement data from a target domain to a source domain, according to an embodiment of the present disclosure.

FIG. 3A illustrates an exemplar block diagram 300A of the generator 212 for mapping the GNSS measurement data 204 from the target domain to the source domain, according to an embodiment of the present disclosure.

The generator 212 is based on an architecture that comprises one auto-encoder (AE) per cluster. The two AEs 302, 304 of same type are utilized. The generator 212 includes an additional cluster classifier 306 to select AE to be used for each specific set of time-windowed measurements. The generator 212 is initialized with trained AE and cluster classifier weights $w_1$ and $w_2$. The generator 212 is trained and a weighted MSE loss L is generated. Further, reconstruction losses of both AEs 302, 304 are weighted by the weight obtained from the cluster classifier 306. To prevent an early degeneration to a single cluster classifier 306, the following training procedure is used: 1) Train each AE 302, 304, 2) Train a K-means classifier on the hidden feature set, 3) Train the cluster classifier with the supervision of the supervised training. The labels obtained by the K-means are used as target labels, 4) Initialize the generator 212 with the trained AE and cluster classifier weights and 5) Train the entire generator 212. In particular, if X is the input, $X_1$ and $X_2$ denote the outputs of both AEs, respectively, and $w_1$ and $w_2$ are the weights obtained from the cluster classifier 306, then the loss for training is given by:

$$L(X,X_1,X_2,w_1,w_2) \triangleq w_1 MSE(X,X_1) + w_2 MSE(X,X_2).$$

Figure 3B:
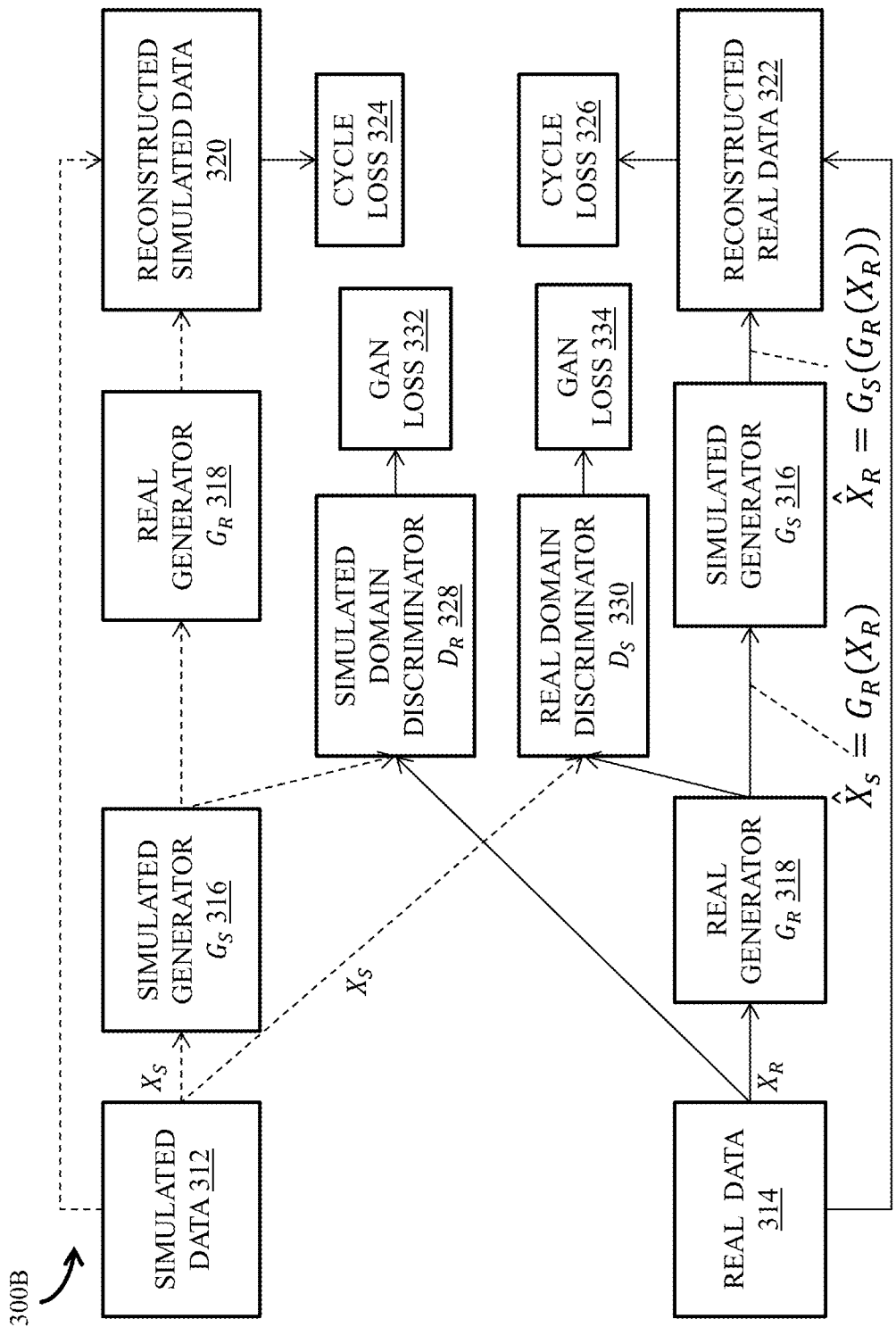
FIG. 3B illustrates an architecture of a cycle-consistent generative adversarial network (CGAN) used to train the generator, according to an embodiment of the present disclosure.

In one example, the generator 212 comprises a cycle-consistent generative adversarial network (CGAN), as illustrated in FIG. 3B.

FIG. 3B illustrates an architecture 300B of the cycle-consistent generative adversarial network (CGAN) used as the generator 212, according to an embodiment of the present disclosure. The architecture 300B includes two generators: a simulated generator 316 and a real generator 318. The simulated generator 316 is utilized to transform simulated data 314 (that is source domain data) to real data 314 (that is target domain data). In addition, the real generator 318 transforms the real data 314 to the simulated data 314. The simulated generator 316 and the real generator 318 trains a simulated domain discriminator 328 and a real domain discriminator 330 respectively to distinguish between true and fake generated data. The simulated domain discriminator 328 and the real domain discriminator 330 are trained in an unsupervised manner and are applied to any real data without the need for prior labeling. The simulated domain discriminator 328 and the real domain discriminator 330 distinguish whether $X_S$ and $\hat{X}_S$ come from the simulated data or real data. Further, mean squared error (MSE) loss function is utilized as generative adversarial network (GAN) loss 332 and 334 for training the simulated generator 316 and the real generator 318, respectively. MSE loss function is the most commonly used for regression, which computes the mean of the squared differences between true and predicted values. Furthermore, element-wise maximum absolute error (MAE) is utilized for generating a cycle loss 324 from reconstructed simulated data 320 and a cycle loss 326 from reconstructed real data 322. This CGAN 300b trains the two generators, 316 and 318, to transform data from one domain to the other domain by ensuring consistency between the original data and recovered data by applying second generators to the transformed data. This processing is required to conserve all multipath information in both data in the source domain and the target domain.

The architecture 300B is trained by alternatively minimizing the generator loss (cycle loss 324 and 326) and discriminator loss (GAN loss 332 and 334) respectively defined by:

Generator loss $\triangleq MSE(1,D_S(G_R(X_R)))+MSE(1,D_R(G_S(X_S)))+\lambda_S MSE(X_S,G_R(G_S(X_S)))+\lambda_R MSE(X_r,G_S(G_R(X_S)))$ and Discriminator loss $\triangleq MSE(0,D_S(G_R(X_R)))+MSE(0,D_R(G_S(X_S)))+MSE(1,D_R(X_R))+MSE(1,D_S(X_S))$, where 1 and 0 respectively denote matrices of ones and zeros; $X_S$ and $X_R$ are sample matrices from the simulated and real data domains; $\lambda_S$ and $\lambda_R$ are loss weighting factors for the cycle loss 324, 326 in both domains; and $G_S$ corresponds to simulated generator 316, $G_R$ corresponds to real generator 318, $D_S$ corresponds to simulated domain discriminator 328, and $D_R$ corresponds to real domain discriminator 330.

Figure 3C:
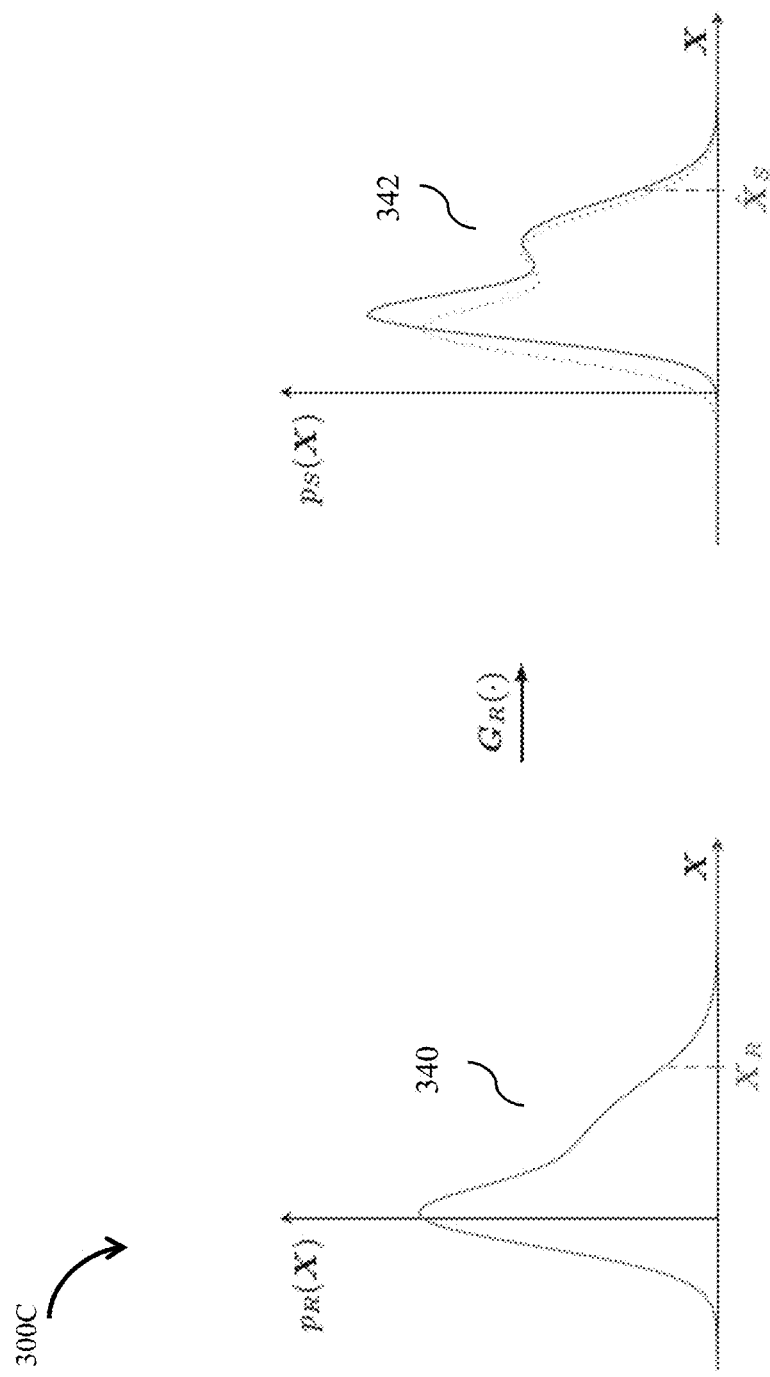
FIG. 3C illustrates a graphical representation of mapping of the plurality of features from the target domain to the source domain using the generator of FIG. 3B, according to an embodiment of the present disclosure.

FIG. 3C illustrates a graphical representation of mapping of the plurality of features from the target domain to the source domain using the generator 212 of FIG. 3A, according to an embodiment of the present disclosure. In addition, FIG. 3C illustrates a graph including the generator $G_R(\cdot)$ and the structure used during training to achieve cross-domain feature distribution alignment between the real domain 340 and simulated domain 342, according to an embodiment of the present disclosure. The generator $G_R(\cdot)$ maps real data $X_R$ to closely resembling simulated data $X_S$. This mapped real data can then be classified as inlier data or outlier data by the neural network 214, as illustrated in FIG. 4A, FIG. 4B, and FIG. 4C.

Figure 4A:
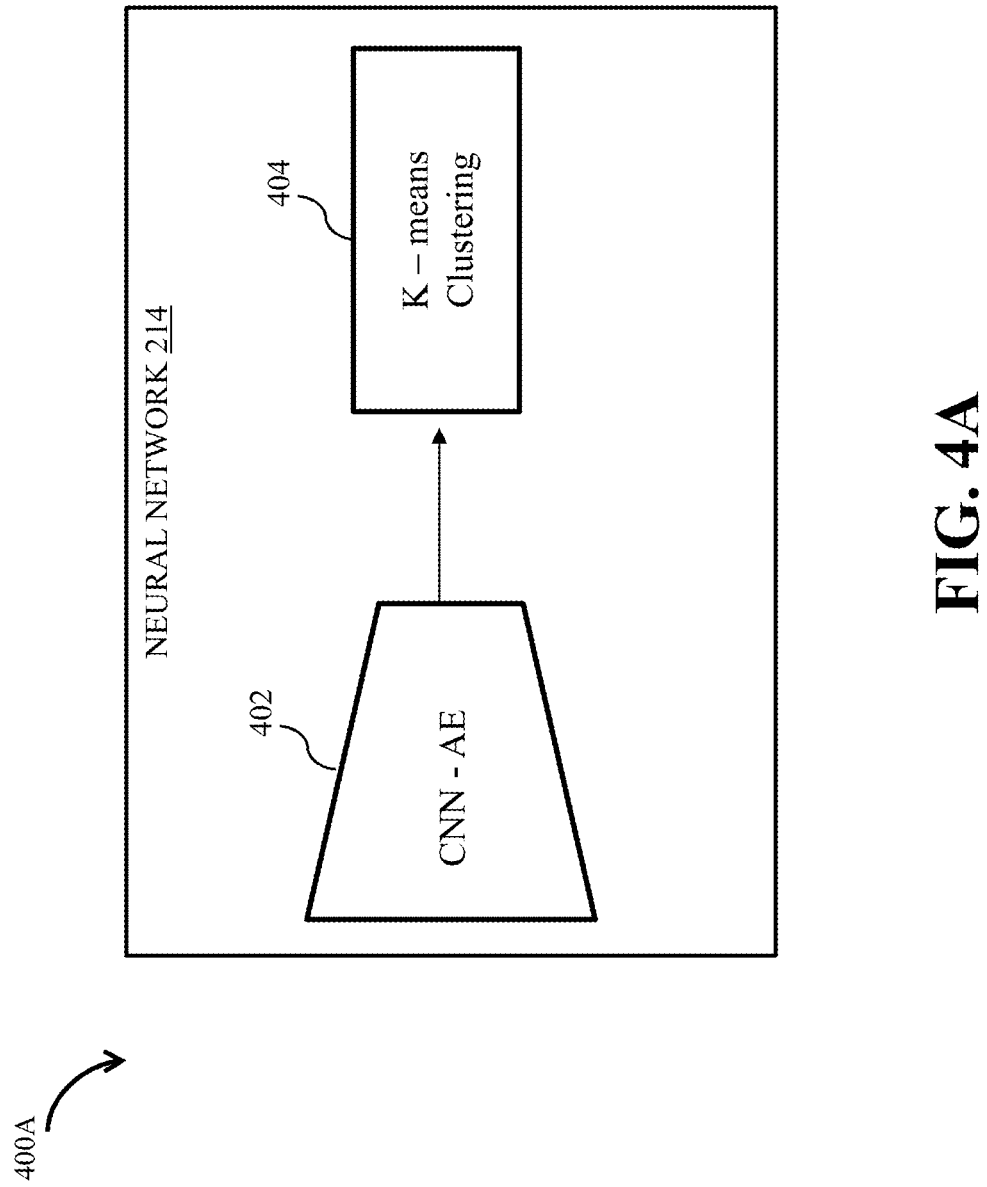
FIG. 4A illustrates a block diagram of a classifier neural network used to classify the GNSS measurement data, according to an embodiment of the present disclosure.

FIG. 4A illustrates a block diagram 400A of the neural network 214 used to classify the GNSS measurement data 204, according to an embodiment of the present disclosure. The neural network 214 includes a convolution neural network Autoencoder (CNN-AE) 402 (as explained in FIG. 3A). The CNN-AE 402 takes the simulated data as input and encodes the simulated data in a low-dimensional representation in a so-called feature space. Further, the neural network 214 performs K-means clustering 404 to distinguish inlier measurements from outlier measurements. K-means clustering 404 is further explained in FIG. 4C.

Figure 4B:
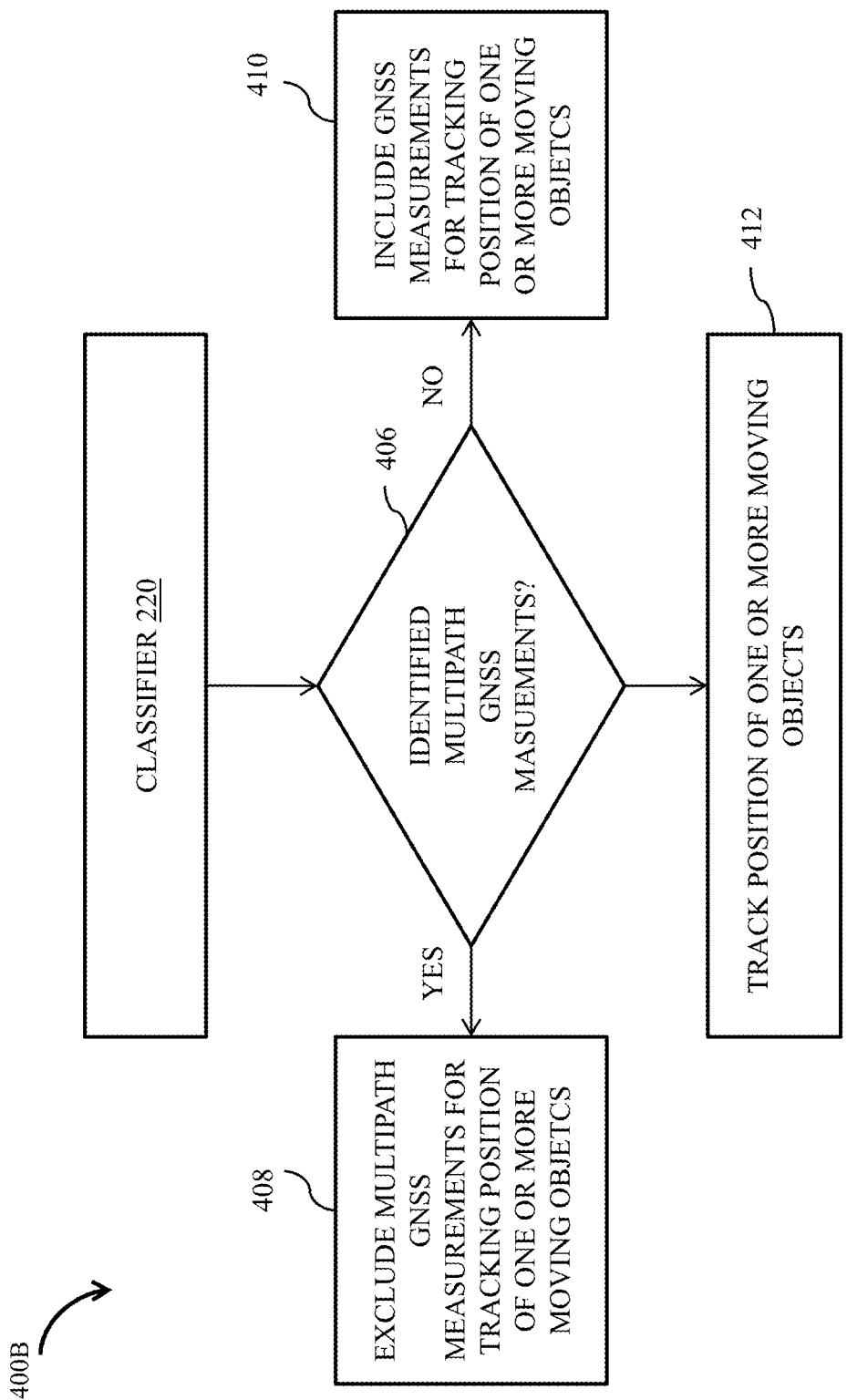
FIG. 4B illustrates a block diagram of a method used by the neural network classifier, according to an embodiment of the present disclosure.
Figure 4C:
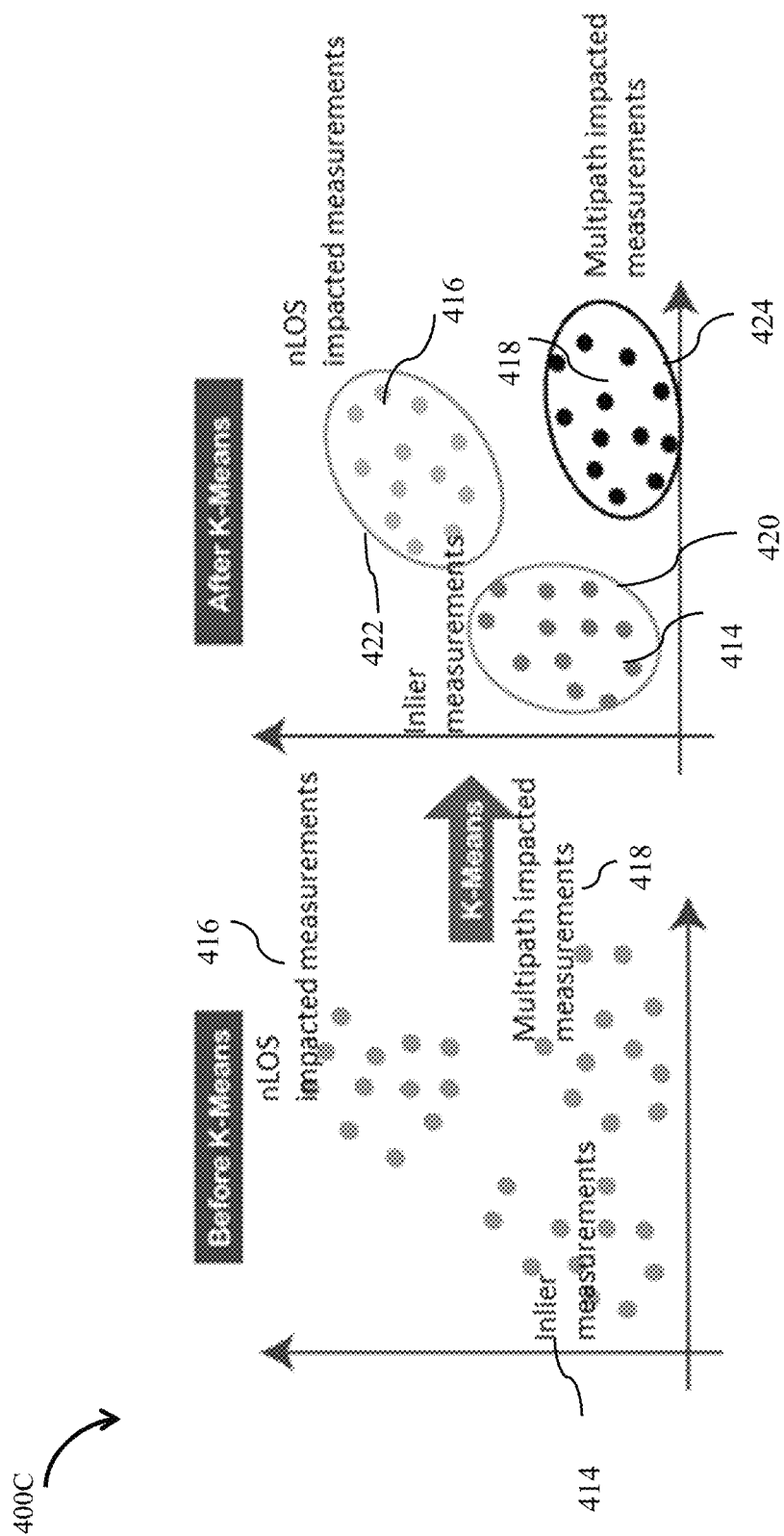
FIG. 4C illustrates classification of the GNSS measurement data into either one of inlier measurements or outlier measurements, using the neural network classifier of FIG. 4A and FIG. 4B, according to an embodiment of the present disclosure.

FIG. 4B shows a block diagram 400B of a method used by the classifier 220 of the neural network 214, according to some embodiments. At step 406, the classifier 220 of the neural network 214 performs identification of multipath GNSS measurement data. If the GNSS measurement data are identified as affected by multipath (YES), step 408 is followed. At step 408, the classifier 220 excludes the multipath GNSS measurements from the position estimator 218 utilized for tracking the position of the one or more moving objects. If the GNSS measurements are not identified as affected by multipath (NO), step 410 is followed. At step 410, the classifier 220 adds or includes the GNSS measurements in the position estimator 218 utilized for tracking the position of the one or more moving objects.

At step 412, the position of the one or more moving objects is tracked using the position estimator 218. The position estimator 218 is a probabilistic filter that is configured to determine the position of the one or more moving objects. The position estimator 218 leverages information from the classifier 220 to include or exclude the GNSS measurements based on the predicted presence of multipath. The position estimator 218 is the probabilistic filter that comprises a mixed-integer Kalman filter that computes an estimate of receiver states conditioned on the GNSS measurements that are deemed to be free on multipath by the classifier 220. (as explained in FIG. 5)

Some embodiments are based on recognition that the position estimator 218 is trained from phase measurements signals to perform multipath detection and/or position estimation. For example, in some embodiments, the position estimator 218 is designed by using encoder-decoder architecture. The encoder is trained to learn a set of input Global Navigation Satellite System (GNSS) phase measurements, the decoder converts the outputs of the encoder into a set of predicted GNSS signal measurements used for the position estimation by extracting a fixed number of features that characterize the temporal dependencies of the set of phase measurements. As an extension of the feed-forward neural network, the position estimator 218 makes connection between the current and past information by adding an edge between hidden states adjacent over processing time, in which the current state value of a hidden layer is influenced by the current phase measurement and the previous state value of hidden layer.

The classifier 220 performs identification of the multipath GNSS measurements based on the training of the classifier 220 using the generator 212 (CGAN). In an embodiment, the classifier 220 removes UNSS measurements having the corresponding mapped plurality of features 212a classified as multipath from the position estimator 218 for tracking the position of one or more moving objects. The CGAN 212 has an architecture comprising two generators and two discriminators to facilitate unsupervised training with respect to a loss function that includes a cycle consistency loss term. The architecture of CGAN 210 is explained above in FIG. 3B.

The classifier 220 is based on the architecture of FIG. 4A and uses K-means clustering 404 to distinguish inlier measurements from outlier measurements (further explained in FIG. 4C).

FIG. 4C illustrates a block diagram 400C of K-means clustering 404, according to an embodiment of the present disclosure. In general, K-means clustering is an unsupervised machine learning algorithm that is used to solve clustering problems. It follows a simple procedure of classifying a given data set into a number of clusters, defined by the letter "k," which is fixed beforehand. In other words, K-means clustering 404 involves division of objects into clusters that share similarities and are dissimilar to the objects belonging to another cluster. The clusters are then positioned as points and all observations or data points associated with the nearest cluster are computed, and adjusted. Then the process starts over using the new adjustments until a desired result is reached. In an embodiment, before K-means clustering 404, inlier measurements 414, NLOS impacted measurements 416, and multipath impacted measurements 418 are placed together in unstructured manner. After applying K-means clustering, all the inlier measurements 414 are grouped together in a cluster 420, all the NLOS impacted measurements 416 are grouped together in a cluster 422 and all the multipath impacted measurements 418 are grouped together in a cluster 424.

Based on these separations, the GNSS measurement data 404 affected and not affected by multipath are identified, and this identification is used by the position estimator 218 for tracking the position of the one or more moving objects.

Figure 5:
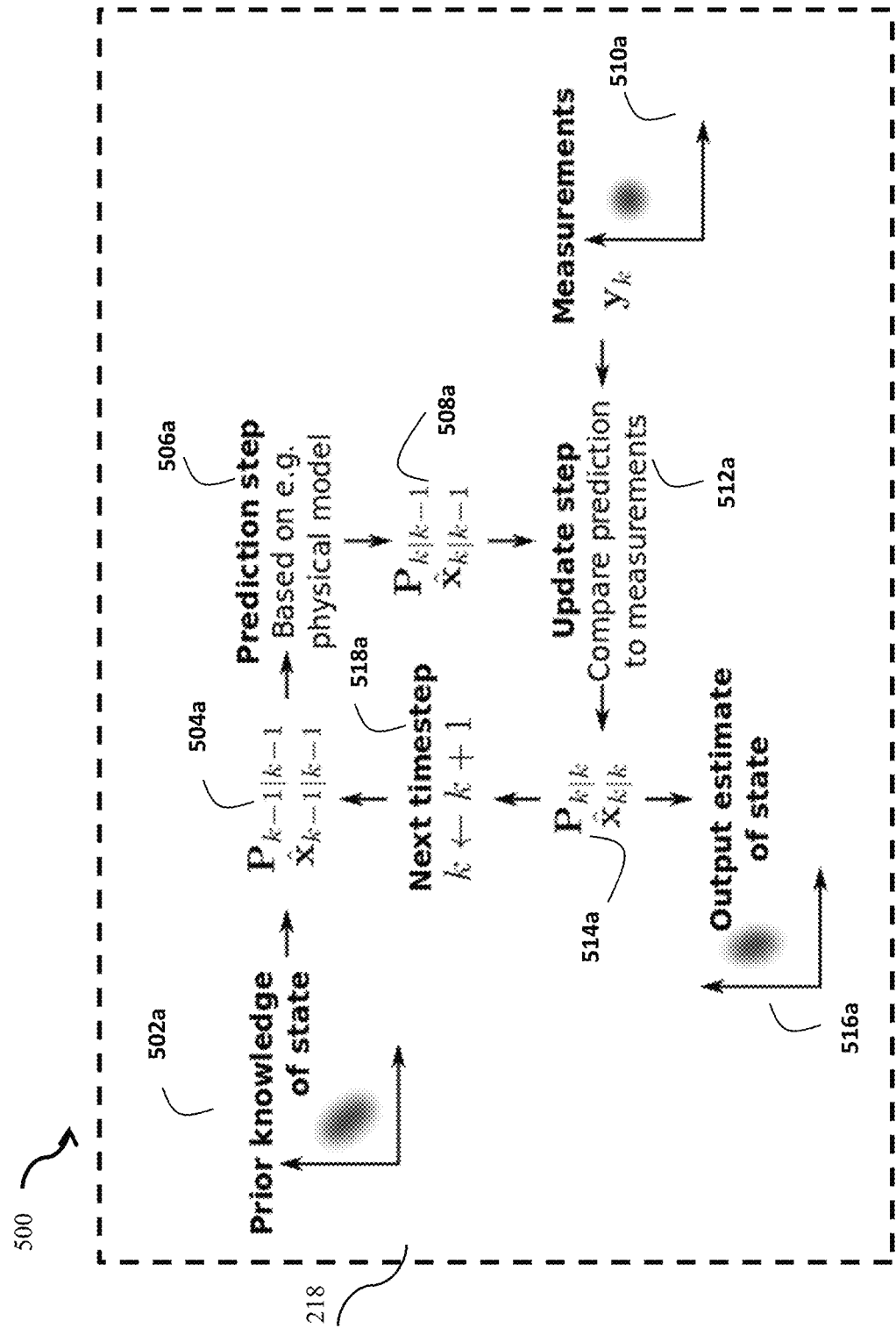
FIG. 5 illustrates a block diagram of an exemplar position estimator used for tracking the position of the one or more moving objects, according to an embodiment of the present disclosure.

FIG. 5 illustrates a block diagram of an exemplar position estimator 218 used for tracking the position of the one or more moving objects, according to an embodiment of the present disclosure. The position estimator 218 is used as a Kalman filter (KF). In addition, the position estimator 218 is implemented as a mixed-integer Kalman filter that computes an estimate of receiver states conditioned on the GNSS measurement data 204 that are identified to be not affected by multipath. The KF is a tool for state estimation in linear state-space models. The KF is the optimal estimator when the noise sources are known and Gaussian when the state estimate is Gaussian distributed. The KF estimates the mean and variance of a Gaussian posterior distribution. The mean and the variance are the two required quantities that are used to describe the Gaussian distribution.

The KF starts with an initial knowledge 502a of the state, to determine a mean of the state and its variance 504a. At step 506a, the KF predicts the state and the variance to the next time step, using a model of the Global Navigation Satellite System (GNSS), such as the motion model of the vehicle, to obtain an updated mean and variance 508a of the state. The KF then uses a measurement 510a in an update step 512a using the measurement model of the GNSS, to determine an updated mean and variance 514a of the state. An output 516a is then obtained, and the procedure is repeated for the next time step 518a.

Some embodiments employ a probabilistic filter including various variants of KFs, such as, extended KFs (EKFs), linear-regression KFs (LRKFs), such as the unscented KF (UKF). Notably, the KF updates the first moment and the second moment, i.e., the mean and covariance, of the probability distribution of interest, using a measurement 510a described by a probabilistic measurement model. In some embodiments, the probabilistic measurement model is a multi-head measurement model structured to satisfy the principles of measurement updates in the KF.

In such a manner, in some embodiments, the probabilistic filter propagates recursively, at each update step 512a, the parameters of the probabilistic distribution of the state of the vehicle according to a motion model of state transitions of the vehicle subject to process noise and updates the parameters of the probabilistic distribution upon receiving outputs of one or a combination of the first head of multi-head measurement model and the second head of multi-head measurement model.

In some embodiments, the model of the motion of a receiver is a general-purpose kinematic constant-acceleration model with the state vector:

$$x_k = [p_{r,k} v_{r,k} a_{r,k}]^T,$$

where the three components are the position, velocity, and acceleration of the receiver. In some other embodiments, the time evolution ambiguity of propagation of the satellite signals is modeled as $n_{k+1} = n_k + w_{n,k}$, with Gaussian distributed noise $w_{n,k} \sim N(0, Q_n)$, where $n_k$ is the ambiguity.

In some embodiments, the ambiguity is included in the state of the vehicle. Other embodiments also include bias states capturing residual errors in the atmospheric delays, e.g., ionospheric delays. For receivers sufficiently close to each other, the ionospheric delays are the same, or similar, for different vehicles. Some embodiments utilize this to relationships to resolve these delays and/or ambiguities.

Some embodiments capture the carrier and code phase signals in the measurement model $y_k = h_k + \lambda n_k + e_k$, where $e_k$ is the measurement noise, potentially also capturing further unmodeled effects, $h_k$ is a nonlinear part of the measurement equation dependent on the position of the receiver, $n_k$ is the integer ambiguity, $\lambda$ is a wavelength of the carrier phase signal, and $y_k$ is a single or double difference measurement combination using observables from multiple satellites.

In some embodiments, the probabilistic filter uses the carrier phase single difference (SD) and/or double difference (DD) for estimating a state of the receiver indicating a position the receiver. When a carrier phase signal transmitted from one satellite is received by two receivers the difference between the first carrier phase and the second carrier phase is referred to as the SD in carrier phase. Alternatively, the SD can be defined as the difference between signals from two different satellites reaching a receiver. For example, the difference can come from a first and a second satellite when the first satellite is called the base satellite. For example, the difference between signal 110 from satellite 102 and signal 112 from satellite 104 is one SD signal, where satellite 102 is the base satellite. Using pairs of receivers, 120 and 118 in FIG. 1, the difference between SDs in carrier phase obtained from the radio signals from the two satellites is called the DD in carrier phase. When the carrier phase difference is converted into the number of wavelengths, for example, $\lambda = 19$ cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

Some embodiments are based on the understanding that a particle filter is a filter that can solve mixed-integer estimation problems without having to resort to optimization methods. Other embodiments understand that to not resort to optimization methods, particle filters need many particles, which can be computationally prohibitive. To this end, some embodiments solve the recursive mixed-integer weighted least squares problem by employing a mixed-integer extended Kalman filter (KF). Other embodiments solve using mixed-integer linear-regression KFs.

Figure 6:
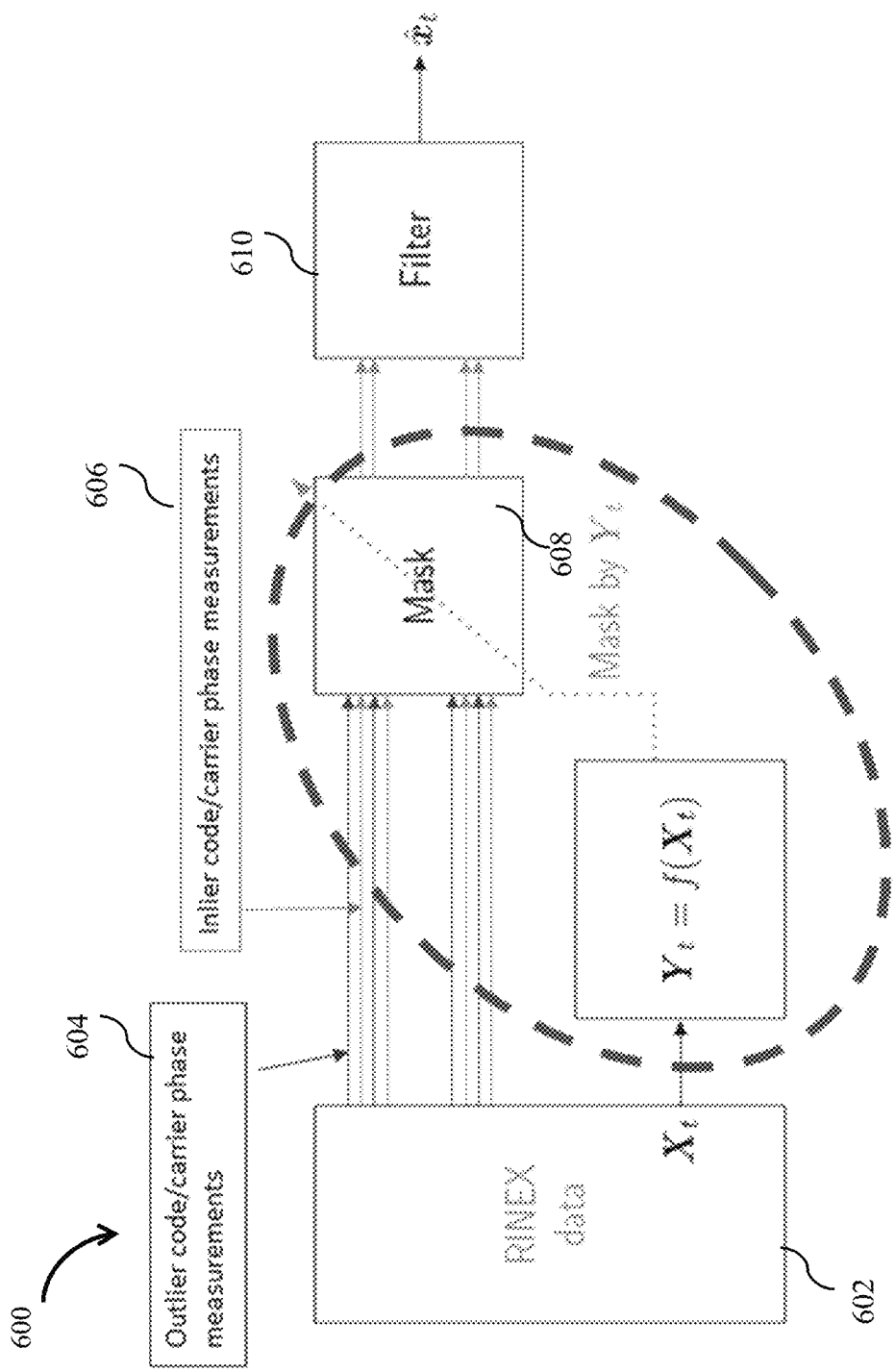
FIG. 6 illustrates a block diagram of an exemplar system for tracking one or more moving objects, according to an embodiment of the present disclosure.

FIG. 6 illustrates a block diagram of an exemplar system 600 for tracking the one or more moving objects, according to an embodiment of the present disclosure.

The exemplar system 600 includes RINEX data 602, a mask 608, and a filter 610. In general, RINEX data corresponds to Receiver Independent Exchange data that includes raw satellite navigation system data relative to a specified interval of time (typically one calendar day). An object $X_t$ is formed from the RINEX data 602. The information of the object $X_t$ is present in the RINEX data 602 over a brief time. The object $X_t$ is passed through a function $f(\cdot)$. The function $f(\cdot)$ is a machine learning approach that outputs the GNSS measurements 606 as inlier measurements/carrier phase measurements or outlier measurements/carrier phase measurements 604 using the mask 608. The output is represented as $Y_t = f(X_t)$. The mask 608 is an elevation mask in which the receiver selects an active set of satellites with the highest elevation angles. While extremely high or low elevations can be signs of the presence or absence of multipath, such elevation masking works poorly in obstructed areas, such as urban environments. The filter 610 utilizes the carrier phase measurements in estimation as determined by the output $Y_t$ to track the position of the object $X_t$. The filter 610 corresponds to the position estimator 218 of FIG. 2B. The tracked position of the object $X_t$ is represented as $\hat{X}_t$. The function $f(\cdot)$ is further explained in FIG. 7.

Figure 7:
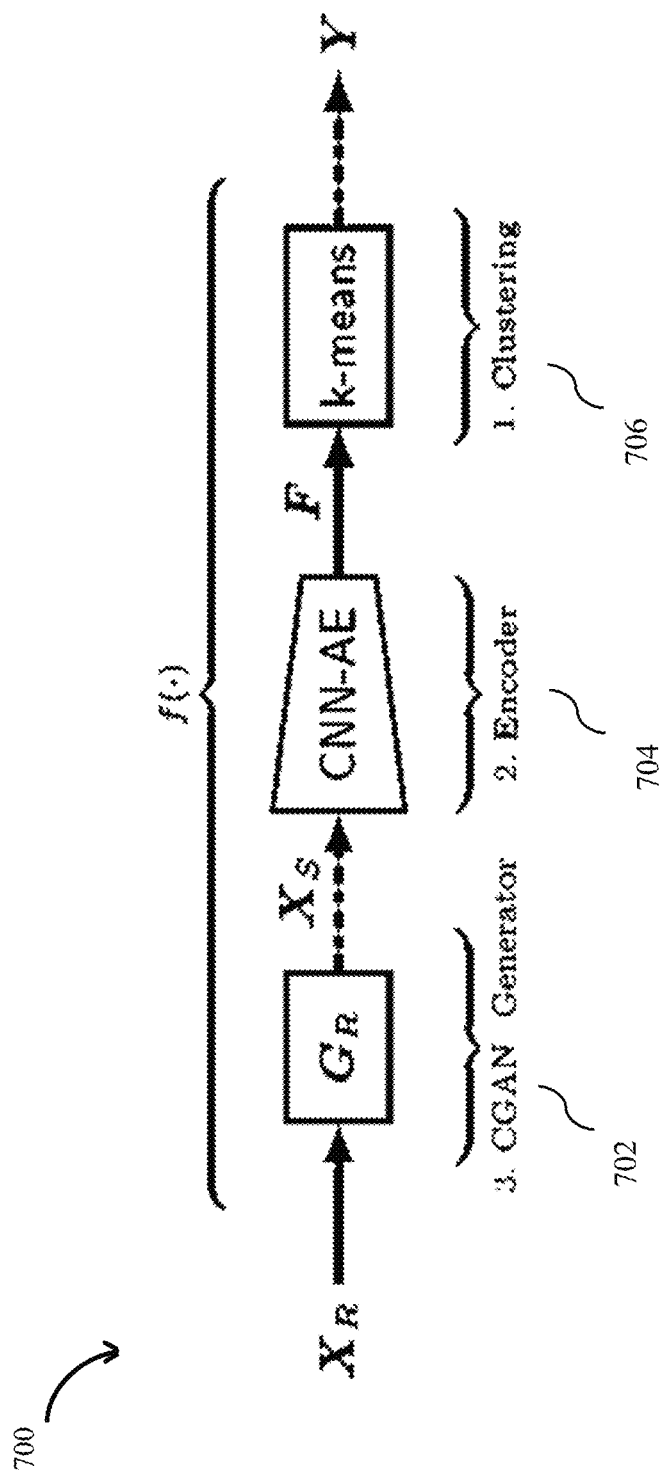
FIG. 7 illustrates a block diagram of a use case depicting a machine learning approach for tracking the position of the one or more moving objects based on the system of FIG. 2A, according to an embodiment of the present disclosure.

FIG. 7 illustrates a block diagram 700 of a use case depicting a machine learning approach for tracking the position of the one or more moving objects using the positioning device of FIG. 2A, according to an embodiment of the present disclosure. The machine learning approach corresponds to implementation of a function $f(\cdot)$ in three steps 702, 704, and 706. At step 702, the CGAN 210 transforms real data $X_R$ to a closely resembling simulated data $X_S$. At step 704, the convolution neural network Auto-encoder (CNN-AE) takes as input the simulated data $X_S$ and encodes the simulated data $X_S$ in a low-dimensional representation at a feature space F. At step 706, K-means clustering 404 is performed to distinguish inlier measurements from outlier measurements. K-means clustering is explained above in FIG. 4C.

Figure 8A:
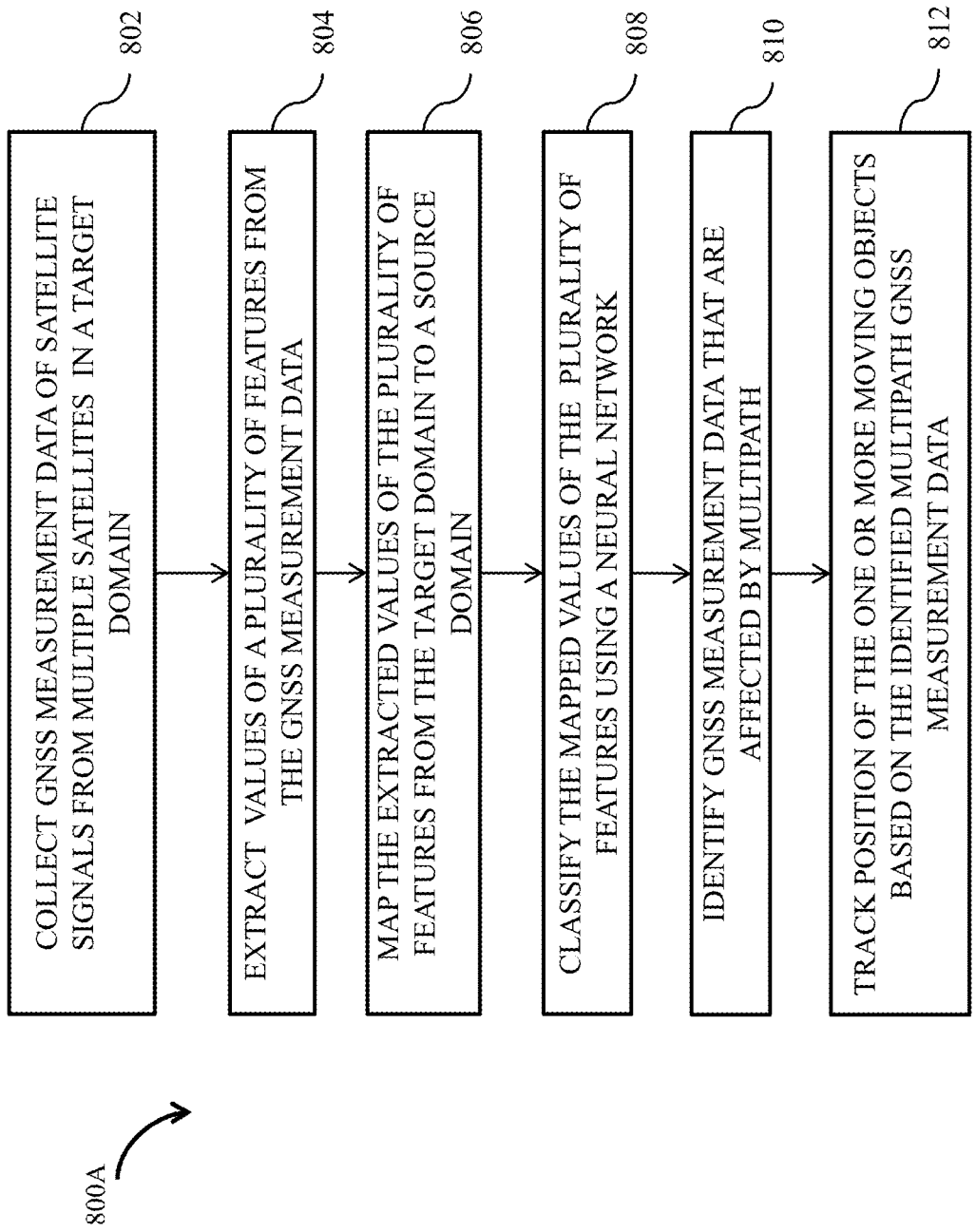
FIG. 8A illustrates a flow chart depicting a method for performing position estimation of one or more moving objects, according to an embodiment of the present disclosure.

FIG. 8A shows a flow chart 800A depicting a method for performing position estimation of the one or more moving objects, according to some embodiments of the present disclosure. At step 802, the method includes collecting GNSS measurement data 204 of one or more satellite signals transmitted from multiple satellites. The GNSS measurement data 204 have a target distribution in a target domain governed by at least a current position of the one or more moving objects with respect to the multiple satellites and an environment surrounding the one or more moving objects in the current position. In general, target domain is a testing domain for which label information is not available.

At step 804, the method includes extracting values of a plurality of features from the GNSS measurement data 204 including at least one of signals formed in code and phase measurements, carrier-to-noise-power-density-ratio, and Doppler shifts. The plurality of features includes one or a combination of carrier-to-noise-power-density-ratio ($C/N_0$) variation over time, code-minus-carrier (CMC) values, values of Doppler rate consistency (DRC), first and second derivatives of signals, relative satellite elevation and the ability of an estimator to fixate integer estimates. In addition, the extracted values comprise values of $C/N_0$ variation over time, code-minus-carrier (CMC) values, and values of Doppler rate consistency (DRC). In general, $C/N_0$ exhibits special behavior under multipath or for NLOS (non-line of sight) signals. A common technique of detecting multipath is to evaluate the $C/N_0$ relative to a threshold. Considering that $C/N_0$ can take a wide range of values even for pure LOS (line of sight) signals, a more advanced solution is to evaluate the $C/N_0$ in relation to its expected value modeled as a nonlinear function in satellite elevation. This requires tuning, and the $C/N_0$ of unhealthy satellites might be high in some situations.

At step 806, the method includes mapping of the extracted values of the plurality of features from the GNSS measurement data to a source domain using a generator, such as the cycle-consistent Generative Adversarial Network (CGAN) (explained further in FIG. 3B). The source domain is the training domain in which simulated data in a statistical sense resemble training data used to train the classifier neural network 214. In general, simulated data are data that are available publicly and can be accessed easily.

At step 808, the method includes classifying the mapped transformed plurality of features using a neural network. The neural network is trained using CNN-auto-encoder with K-means clustering 404 to classify the mapped plurality of features 212a of the GNSS measurement data 204. The mapped plurality of features 212a are classified as Miler measurements and outlier measurements. The K-means clustering distinguishes between the inlier measurements and the outlier measurements. (further explained in FIG. 6).

In one embodiment, the neural network 214 is trained with training of the simulated data having a source distribution of the source domain different from the target distribution of the target domain. The neural network 214 is trained online using the GNSS measurements of the target domain and the trained simulated data of the source domain. In addition, the neural network 214 is trained using the cycle-consistent generative adversarial network (CGAN). In another embodiment, the neural network is at least pre-trained offline using unbalanced supervised learning with instances of the trained simulated data having the source distribution and instances of labeled simulated data having the target distribution.

At step 810, the method includes identifying GNSS measurement data that are affected by multipath based on the classification of the mapped plurality of features 212a. The GNSS measurement data having the corresponding mapped plurality of features 212a classified as multipath are removed from tracking the position of the one or more moving objects.

At step 812, the method includes tracking the position of the one or more moving objects in the target domain by processing the GNSS measurement data classified as multipath using the position estimator 218 based on training of the classifier 220 of the neural network 214. The classifier 220 of the neural network 214 is trained in the source domain to classify the GNSS measurement data in a presence of noise as clean measurements, i.e., measurements free of multipath and have line-of-sight (LOS) transmission, and outlier measurements, i.e., measurements corrupted by biases and non-line-of-sight (NLOS) transmission of at least some of the satellite signals at some instances of time.

As one embodiment, a recurrent neural network is used as the position estimator 218. The recurrent neural network uses an attention-based multimodal fusion that applies different weights to at least some different GNSS measurements to estimate the position of the one or more moving objects from the weighted GNSS measurements. The position estimator 218 is a probabilistic filter that is configured to determine a set of combinations of integer values of carrier phase ambiguities consistent with measurements of a carrier phase signal and a code phase signal according to one or combination of a motion model and a measurement model within bounds defined by one or combination of a process noise and a measurement noise. In addition, the probabilistic filter is configured to execute a set of position estimators determining positions of a receiver by jointly using the motion model and the measurement model. Each position estimator 218 determines a joint probability distribution of the position of the receiver with respect to the motion model and the measurement model. The measurement model of at least some different position estimators includes different combinations of integer values of the carrier phase ambiguities. Further, the probabilistic filter is configured to determine the position of the receiver using the position estimator with the highest joint probability of the position of the receiver based on measurements of the carrier phase signal and the code phase signal. The probabilistic filter includes but not limited to a mixed-integer Kalman filter that solves a mixed-integer least squares problem to update first moment and second moment of the joint probability distribution of augmented state of multiple vehicles. In one embodiment, the position estimator includes a preprocessing block or a classifier that classifies the GNSS signals into the line-of-sight (LOS) and non-line-of-sight (NLOS)/multipath. After the classification, only LOS signals are inputted to the position estimator 218.

The classifier 220 is trained in the source domain to classify the GNSS measurements as clean measurements or outlier measurements. The position estimator 218 determines the position of the one or more moving objects from the GNSS measurements, and selects the GNSS measurements to include based on the training of the classifier of the neural network. In one embodiment, the neural network 214 is pre-trained offline and updated online during tracking the position of the one or more moving objects using the extracted values of the plurality of features 210' of the GNSS measurements.

Figure 8B:
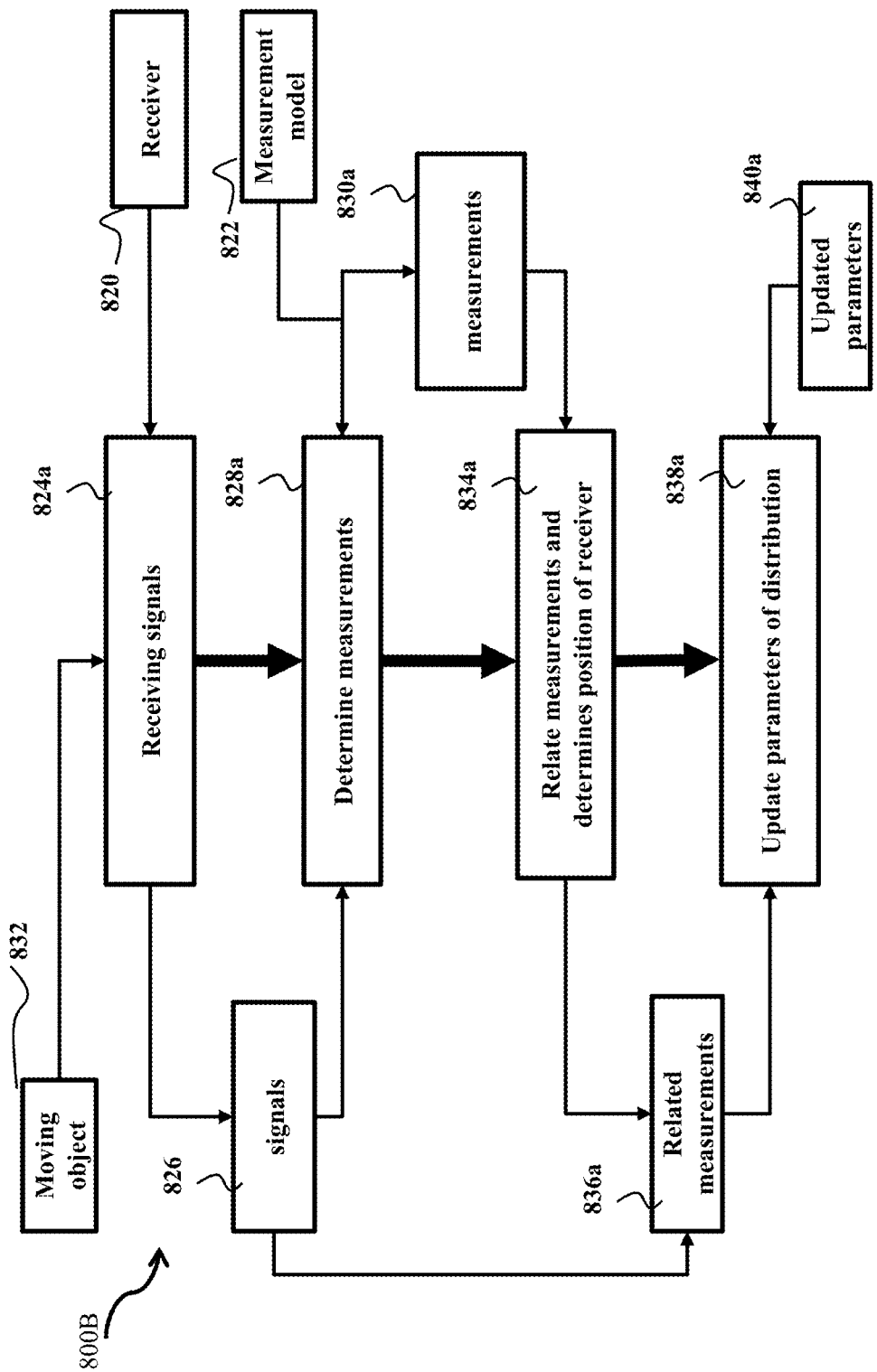
FIG. 8B illustrates a flowchart of a method for position estimation of a moving object configured to receive measurements of carrier phase and code phase signals transmitted from a set of satellites, according to an embodiment of the present disclosure.

FIG. 8B shows a flowchart 800B of a method for position estimation of a moving object 832 configured to receive measurements of the carrier and code phase signals 826 transmitted from a set of satellites, according to some embodiments. At step 824a, the method includes receiving the carrier phase and code phase signals associated with the moving object 832. Each carrier phase signal includes a carrier phase ambiguity as an unknown integer number of wavelengths of the carrier phase signal travelled between the satellite 102, 104, 106, or 108 (not shown in FIG. 8B, referred from FIG. 1) and the moving object 832. Next, the method retrieves from a memory a motion model relating a previous position of the receiver 820 to a current position of the receiver 820 and a measurement model 822 relating measurements of the carrier phase and the code phase signals 826 to the current position of the receiver 820 using the carrier phase ambiguities of the carrier phase signals. The motion model and the measurement model 822, are probabilistic models. For example, the motion model is a probabilistic model subject to process noise, and the measurement model 822 is a probabilistic model subject to measurement noise.

At step 828a, the method then determines a set of possible combinations of integer values 830a of the carrier phase ambiguities consistent with the measurements of the carrier phase and the code phase signals 826 according to one or combination of the motion model and the measurement model 822 within bounds defined by one or combination of the process noise and the measurement noise. This step is based on understanding that instead of attempting to determine the carrier phase ambiguities to perform position estimation, it is beneficial to determine and assess different possible combination of the carrier phase ambiguities for the position estimation. In such a manner, the best carrier phase ambiguities are selected using the probabilistic model better reflecting the nuances of the position estimation.

To that end, at step 834a, the method executes a set of position estimators determining positions of the receiver 820 by jointly using the motion model and the measurement model 822. Each position estimator includes its corresponding combination of the integer values of the carrier phase ambiguities to determine a joint probability distribution 836a of the position of the receiver with respect to the motion model and the measurement model 822, which in one embodiment is defined by the classifier 220 operating on transformed signals. In such a manner, the combinations of the integer values of the carrier phase ambiguities are evaluated probabilistically, because the measurement models of at least some different position estimators include different combinations of integer values of the carrier phase ambiguities selected from the measurements (set of possible combinations) 830a. Next, the method determines the position of the receiver 820 using a position estimator with the highest joint probability of the position of the receiver 820 according to the measurements of the carrier phase and the code phase signals 826. At step 838a, the method updates parameters of the distribution of the position of the receiver 820 using updated parameters 840a computed by relating the acquired measurements to the defined measurement model.

To that end, some embodiments are based on realization that estimation of the range of possible integer values of carrier phase ambiguities as well as the selection of the integer values of carrier phase ambiguities from that range can be done probabilistically using consistency of the motion and the measurement models with respect to a probability density function (PDF) of the noise of the measurement model 822.

Figure 8C:
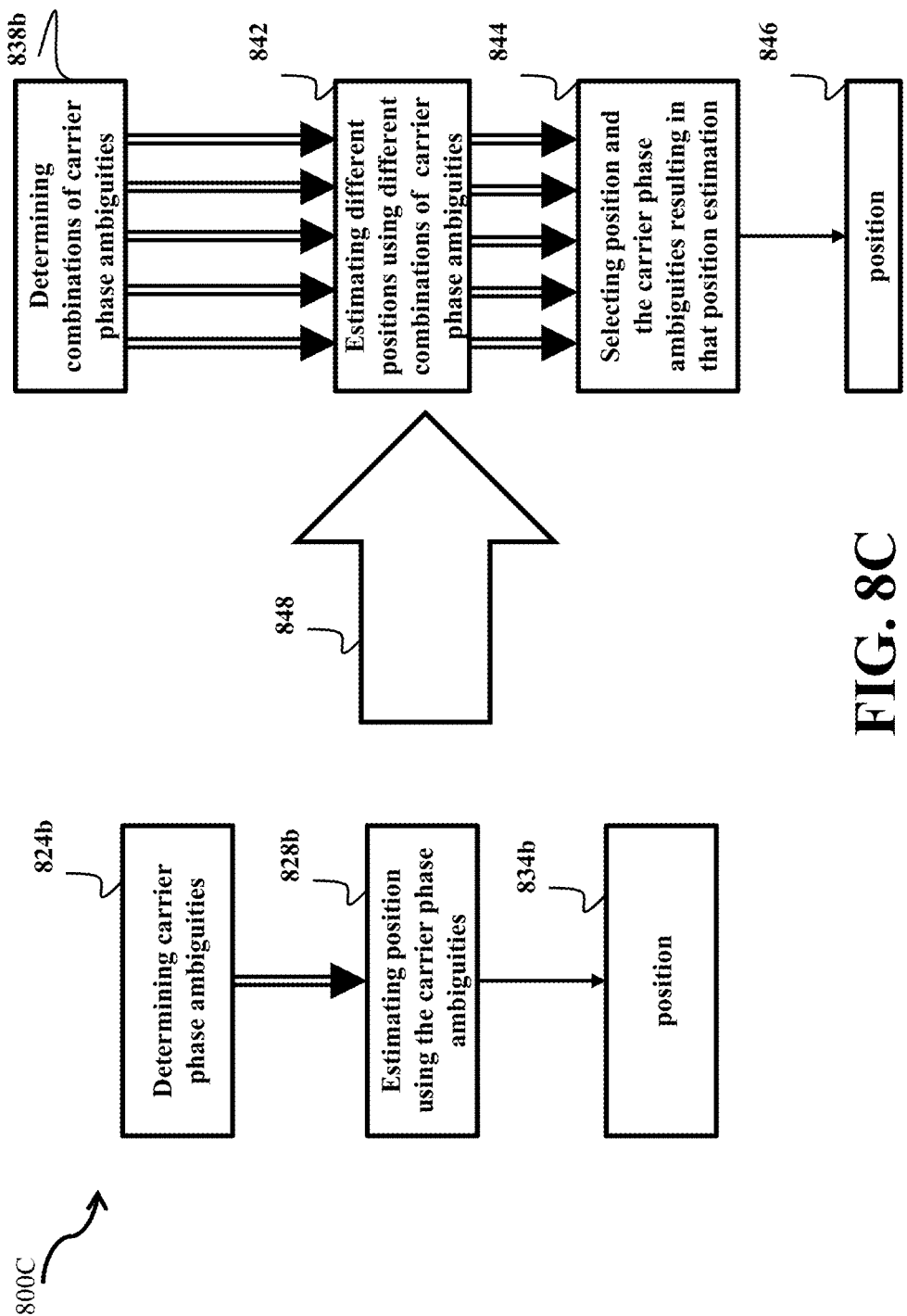
FIG. 8C illustrates a schematic diagram outlining some principles employed by the positioning device of FIG. 2A, according to an embodiment of the present disclosure.

FIG. 8C illustrates a schematic diagram 800C outlining some principles employed by the positioning device 202 of FIGS. 2A, and 2B, according to an embodiment of the present disclosure. Specifically, some embodiments are based on realization that the finite number of possible integer values of carrier phase ambiguity allows to perform a step 838b. At step 838b, different combinations of those possible integer values for tracking the position of the GNSS receiver are determined.

Such a realization allows performing a step 848 to replace the three steps 824b, 828b and 834b with steps 842, 844, and 846. The step 824b includes determining or evaluation of the carrier phase ambiguities for estimating position of the receiver. The step 828b includes estimation of the position of the receiver using the carrier phase ambiguities. The step 834b includes the position of the GNSS receiver. The step 844 includes evaluation of different positions of the GNSS receiver determined at step 842 using different combinations of the carrier phase ambiguities. This replacement is advantageous, as the probabilistic nature of the motion of the receiver is better equipped to assess the position than to assess derivative of the position, such as the carrier phase ambiguity. In such a manner, the best position 846 selected using the probabilistic nature of the motion of the receiver automatically indicates the corresponding combination of the carrier phase ambiguity used to determine the best position 846.

Another example of the position estimator 218 is the KF, which uses a series of measurements observed over time, containing statistical noise and other inaccuracies, and produces estimates of unknown variables that tend to be more accurate than those based on a single measurement alone, by estimating a joint probability distribution over the variables for each time frame. The KF keeps track of the estimated state of the positioning device 202 and the uncertainty of the estimate. The estimate is updated using motion model of state transitions and the measurements. Some embodiments use a KF-based system with a motion model subject to process noise of a GNSS receiver associated to a moving object and a measurement model of satellites signals subject to measurement noise. In some embodiments, the measurement model is probabilistic and multi-head, i.e., includes multiple paths producing different types of outputs. The measurement model includes different information and different types of noise but having similar structure acceptable by the probabilistic filter allowing to use outputs of different heads either individually or jointly.

Figure 8D:
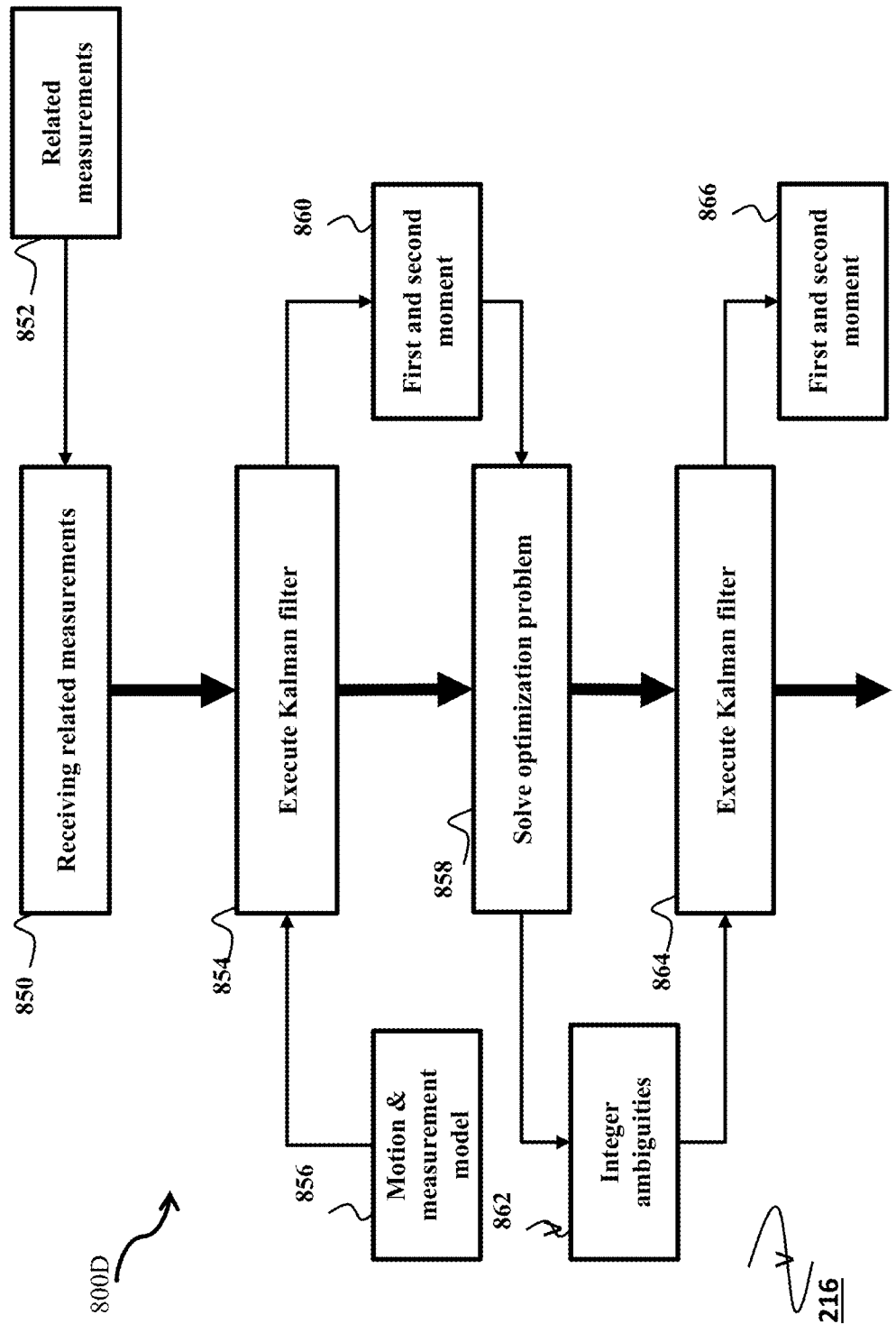
FIG. 8D illustrates a flowchart of a method for executing a position estimator to update parameters of probabilistic distribution of a state of a vehicle, according to an embodiment of the present disclosure.

FIG. 8D illustrates a flowchart of a method for executing the position estimator 218 to update parameters of probabilistic distribution of a state of a vehicle, according to an embodiment of the present disclosure. At step 850, the method receives related measurements 852 of the states including the measurement model without the outlier measurements. Each carrier phase signal includes a carrier phase ambiguity as an unknown integer number of wavelengths of the carrier phase signal travelled between the satellite 102, 104, 106, or 108 and the moving object 832. Next, at step 856, the method retrieves from a memory a motion model relating a previous state of the vehicle to a current state of the vehicle and the measurement model relating measurements of the carrier phase and the code phase signals to the current belief of the state of the vehicle using the carrier phase ambiguities of the carrier phase signals and the estimation of the state of the vehicle to the belief of the state of the vehicle. Both models, i.e., the motion model and the measurement model, are probabilistic. For example, the motion model is a probabilistic model subject to process noise, and the measurement model is a probabilistic model subject to measurement noise. Using the measurement model, measurements, motion model, and the parameters of probability distribution determined during a previous iteration, the method perform a step 854 for execution of a Kalman filter (KF) that updates the first moment and the second moment of the probability distribution. The updated first moment of the ambiguity contained in the state is real valued. Next, at step 858, the method solves a weighted least squares optimization problem that fixes the ambiguities to have integer values. The optimization problem cost function is a squared Euclidean norm of the deviation of the first moment of the state to the valued estimates 860 determined by the KF 854. Using the resulting integer ambiguities 862, at step 864, the method executes the KF initialized with the real valued part of the first moment and the integer valued part of the first moment, resulting in updated parameters of probabilistic distribution.

In some embodiments, the KF is an extended KF, and nonlinear parts of the motion and measurement model are linearized around the current belief of the state. In other embodiment, the KF is a linear-regression KF, for example, an unscented KF, a cubature KF, or a smart-sampling KF. Linear-regression KFs avoid the linearization around the current state estimate as in the extended KF and are generally accurate but computationally complex. Instead of linearization, linear-regression KFs solve the involved moment integrals by a set of weighted integration points and can be used to determine other parameters of probabilistic distributions, such as higher-order moments. Such higher order moments are useful in situations when the first moment and the second moment do not sufficiently well represent underlying distribution.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Figure 9:
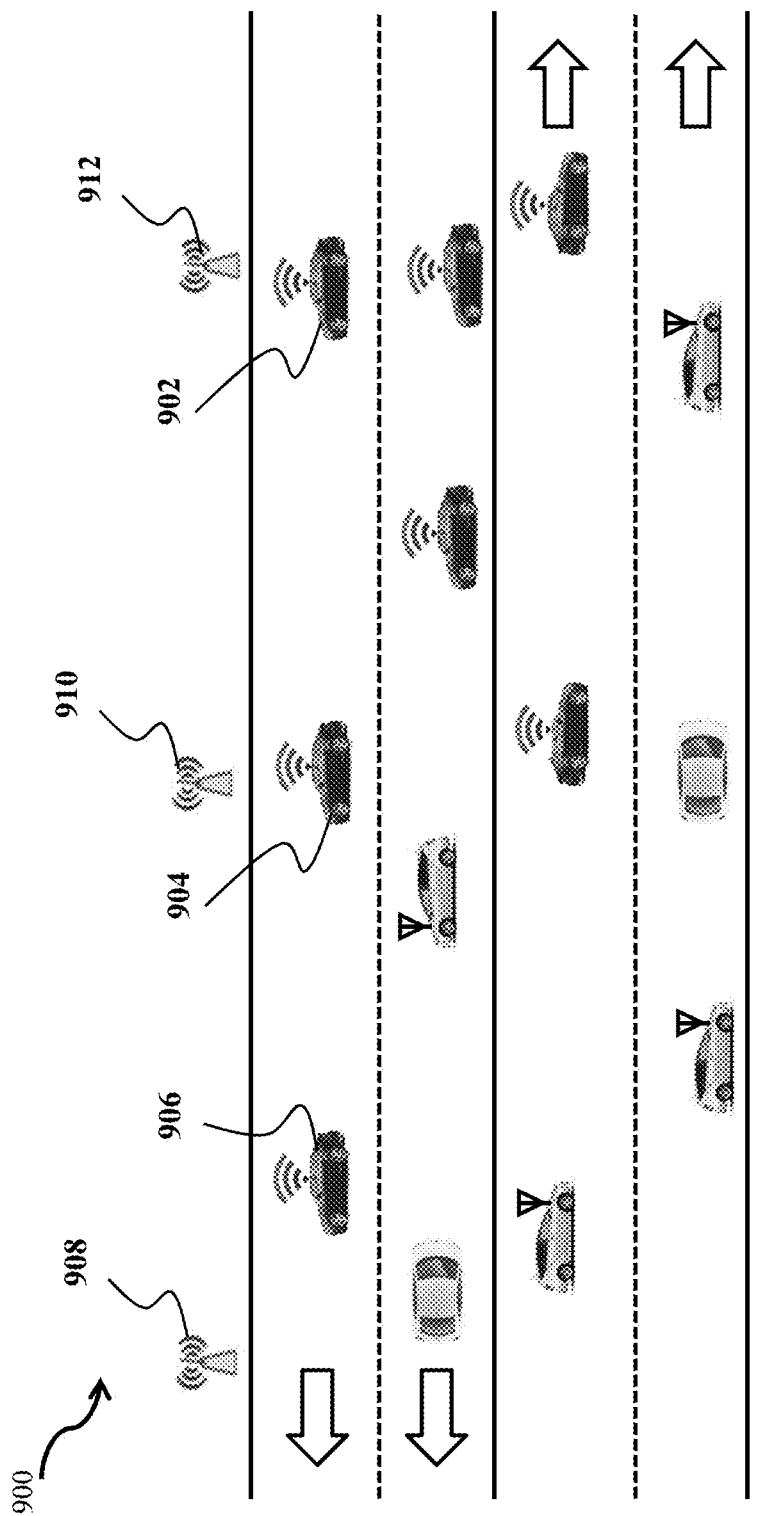
FIG. 9 illustrates a use case of the positioning device acting as a control system implemented over a vehicular network, according to an embodiment of the present disclosure.

FIG. 9 illustrates a use case of the positioning device 202 acting as a control system 900 implemented over a vehicular network to control navigation of the one or more moving objects, according to an embodiment of the present disclosure. In this embodiment, the one or more moving objects corresponds to vehicles, such as any of vehicles: vehicle 902, 904, and 906, The vehicles 902, 904, and 906 are in communication with an access point of the vehicular network, such as an access point 912, 910, and 908. The control system 900 may be installed on a roadside for controlling motion or navigation of the vehicles 902, 904, and 906. In such a manner, some elements of the control system 900 are implemented on the vehicles 902, 904, and 906, and some elements are implemented on an access point and/or other systems operatively connected to the access point. In this example, the vehicles 902, 904, 906 can be different vehicles, or the same vehicle at different points of time.

For example, in one embodiment, the vehicle 902 includes a transceiver to transmit the GNSS measurement data to the access point 912 and to receive estimates of the position of the vehicle from the access point. The position estimation is performed by the access point 912 using the positioning device 202 described in embodiments disclosed above (and/or other systems operatively connected to the access point) and transmitted back to the vehicle. Further, a neural network is trained to determine positions in an area of the vehicular network covered by the access point 912. When the vehicle moves between the areas covered by different access points, such as access points 910 or 908, unbeknownst to the vehicle, different access points track the position of the vehicle. In an example, the control system 900 controls the navigation and/or movement of the vehicles 902, 904, and 906 based on their tracked positions. The control system 900 collects real time traffic data. Further, the control system controls the movement of the vehicles 902, 904, and 906 such as speed of the vehicles 902, 904, and 906, 900 based on the tracked positions of the vehicles 902, 904, and 906 and the real time traffic data. The control system 900 may provide a navigation route to the vehicles 902, 904 and 906 based on their tracked positions.

Figure 10:
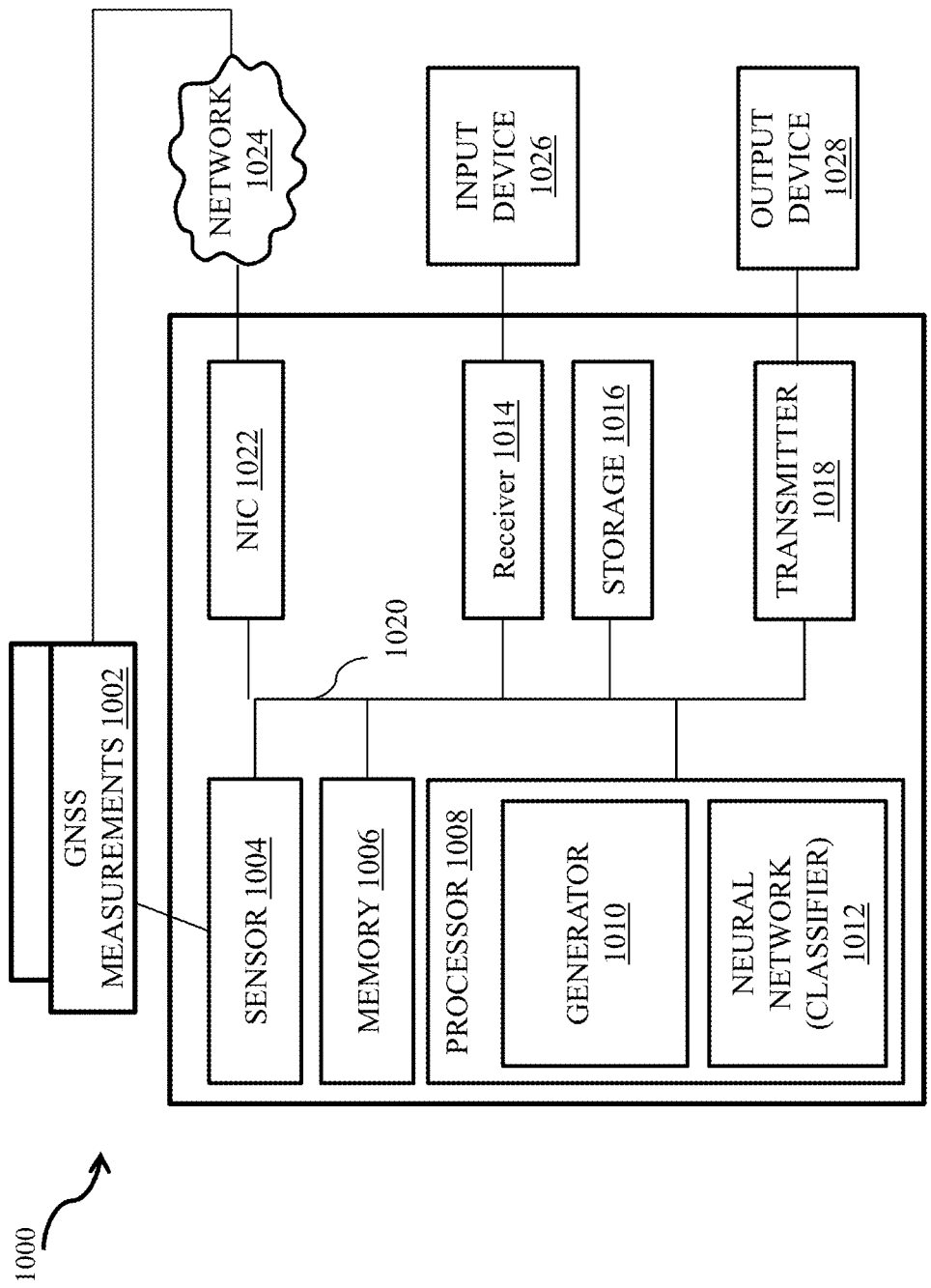
FIG. 10 illustrates a block diagram of a computer-based system for tracking the position of one or more moving objects, according to an embodiment of the present disclosure.

FIG. 10 illustrates a block diagram of a computer-based system 1000 for tracking the position of the one or more moving objects, according to an embodiment of the present disclosure.

The system 1000 includes at least one processor 1008 and a memory 1006 having instructions stored thereon including executable instructions for being executed by the at least one processor 1008 during controlling of the system 1000. The memory 1006 is embodied as a storage media such as RAM (Random Access Memory), ROM (Read Only Memory), hard disk, or any combinations thereof. For instance, the memory 1006 stores instructions that are executable by the at least one processor 1008. In one example embodiment, the processor 1008 is configured to train a generator 1010 and a classifier 1012. The generator corresponds to the generator 212 of FIG. 2A. The classifier 1012 corresponds to the classifier 220 of FIG. 2B.

The at least one processor 1008 can be embodied as a single core processor, a multi-core processor, a computing cluster, or any number of other configurations. The at least one processor 1008 is operatively connected to a sensor 1004, a receiver 1014 via a bus 1020. In an embodiment, the at least one processor 1008 is configured to collect GNSS measurements 1002. In some example embodiments, the GNSS measurements 1002 are collected from the receiver 1014. The receiver 1014 is connected to an input device 1026 via a network 1024. The GNSS measurements 1002 are stored in storage 1016. In some other example embodiments, the GNSS measurements 1002 are collected from the sensor 1004.

Additionally or alternatively, the system 1000 is integrated with a network interface controller (NIC) 1022 to receive the GNSS measurements 1002 using the network 1024.

The at least one processor 1008 is configured to train the generator 1010 for domain adaptation and the classifier 1012 for classifying if the satellite data contains multipath biases. In that sense the neural network 1010 represents the generator.

The trained classifier 1012 determines if the measurement data is corrupted by multipath biases, and this information is used by the position estimator 218 to estimate the location of the one or more moving objects. The estimation is transmitted via a transmitter 1018. Additionally or alternatively, the transmitter 1018 is coupled with an output device 1028 to output of the tracked position of the one or more moving objects over a wireless or a wired communication channel, such as the network 1024. The output device 1028 includes a computer, a laptop, a smart device, or any computing device that is used for preventing adversarial attacks in applications installed in the output device 1028.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of several suitable programming languages and/or programming or scripting tools and may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A positioning device for tracking a position of one or more moving objects based on transmissions from a global navigation satellite system (GNSS), the positioning device comprising: a processor; and a memory having instructions stored thereon that, when executed by the processor, cause the positioning device to:

collect GNSS measurement data of satellite signals transmitted from multiple satellites of the GNSS, wherein the GNSS measurement data are collected during motion of the one or more moving objects in a target domain;

extract values of a plurality of features from the GNSS measurement data indicative of one or a combination of code and phase values, carrier-to-noise-power-density-ratio, and Doppler shifts of the satellite signals collected in the target domain, such that a statistical distribution of the extracted values of the plurality of features is governed by the target domain;

map the extracted values of the plurality of features from the target domain to a source domain, such that a statistical distribution of the mapped values of the plurality of features resembles a statistical distribution of values of a plurality of training features collected in the source domain, wherein the processor is configured to map the extracted values of the plurality of features using a cycle-consistent Generative Adversarial Network (CGAN) performing a tensor-to-tensor translation of tensors formed by the extracted values of the plurality of features and tensors formed by training features used for training the neural network;

classify the mapped values of the plurality of features using a neural network trained with the training features sampled from the source domain to identify the GNSS measurement data affected by multipath; and track the position of the one or more moving objects by processing the GNSS measurement data based on the identified GNSS measurement data affected by multipath.

2. The positioning device of claim 1, wherein the processor is configured to remove the identified GNSS measurement data affected by multipath from the collected GNSS measurement data utilized for tracking.

3. The positioning device of claim 1, wherein the classifier estimates a probability of different instances of the GNSS measurement data to be affected by the multipath, and wherein the processor is configured to track the position of the one or more moving objects using a probabilistic position estimator based on the probabilities of different instances of the GNSS measurement data being affected by multipath.

4. The positioning device of claim 1, wherein the position of the one or more moving objects is tracked using a position estimator, wherein the position estimator is a probabilistic filter that is configured to determine the position of the one or more moving objects based on the identification of the GNSS measurement data as either of affected or not affected by multipath.

5. The positioning device of claim 4, wherein the position estimator is the probabilistic filter that comprises a mixed-integer Kalman filter that computes an estimate of receiver states conditioned on the GNSS measurement data that are identified to be not affected by multipath.

6. The positioning device of claim 1, wherein the plurality of features includes features indicative of carrier-to-noise-power-density-ratio ($C/N_0$) variation over time, code-minus-carrier (CMC) values, and Doppler rate consistency (DRC).

7. The positioning device of claim 1, wherein the plurality of features includes one or a combination of features indicative of carrier-to-noise-power-density-ratio ($C/N_0$) variation over time, code-minus-carrier (CMC) values, and Doppler rate consistency (DRC), derivatives of the $C/N_0$, CMC, and the DRC, relative satellite elevations, and estimator integer fixation estimates.

8. The positioning device of claim 1, wherein an architecture of the CGAN includes two generators and two discriminators, such that the architecture is associated with a loss function that includes a cycle consistency loss term for providing unsupervised training for the CGAN.

9. The positioning device of claim 1, wherein the neural network is trained using a CNN-auto-encoder (CNN-AE) with K-means clustering to classify the mapped plurality of features of the GNSS measurement data, wherein the mapped plurality of features are classified as either one of inlier measurements and outlier measurements, wherein the K-means clustering distinguishes between the inlier measurements and the outlier measurements.

10. The positioning device of claim 1, wherein the neural network is pre-trained offline and updated online during tracking of the position of the one or more moving objects using the extracted values of the plurality of features of the GNSS measurement data.

11. The positioning device of claim 1, wherein the neural network is trained using simulated data associated with the GNSS measurement data collected during navigation of objects in the source domain.

12. The positioning device of claim 1, wherein the one or more moving objects include a vehicle.

13. The positioning device of claim 1, wherein the positioning device is further configured to control motion of the one or more moving objects based on the tracked position of the one or more moving objects.

14. A computer-implemented method for tracking a position of one or more moving objects based on transmissions from a global navigation satellite system (GNSS), wherein the computer-implemented method is executed by a processor coupled with stored instructions implementing the method, wherein the stored instructions, when executed by the processor conduct steps of the method, comprising:
   collecting GNSS measurement data of satellite signals transmitted from multiple satellites, wherein the GNSS measurement data are collected during motion of the one or more moving objects in a target domain;
   extracting values of a plurality of features from the GNSS measurement data indicative of one or a combination of code and phase values, carrier-to-noise-power-density-ratio, and Doppler shifts of the satellite signals collected in the target domain, such that a statistical distribution of the extracted values of the plurality of features is governed by the target domain;
   mapping the extracted values of the plurality of features from the target domain to a source domain, such that a statistical distribution of the mapped values of the plurality of features resembles a statistical distribution of values of a plurality of training features collected in the source domain, wherein the extracted values of the plurality of features, called the tensor, are mapped using a cycle-consistent Generative Adversarial Network (CGAN) performing a tensor-to-tensor translation of tensors formed by the extracted values of the plurality of features and tensors formed by training features used for training the neural network;
   classifying the mapped values of the plurality of features using a neural network trained with the training features sampled from the source domain to identify the GNSS measurement data affected by multipath; and
   tracking the position of the one or more moving objects by processing the GNSS measurement data based in identified GNSS measurement data affected by multipath.

15. The computer-implemented method of claim 14, wherein the identified GNSS measurement data affected by multipath are removed from the collected GNSS measurement data utilized for tracking.

16. The computer-implemented method of claim 14, wherein the plurality of features includes features indicative of carrier-to-noise-power-density-ratio ($C/N_0$) variation over time, code-minus-carrier (CMC) values, and Doppler rate consistency (DRC).

17. The computer-implemented method of claim 14, further comprising:
   controlling movement of the one or more moving objects based on the tracked position of the one or more moving objects.

18. A non-transitory computer readable storage medium embodied thereon a program executable by a processor for performing a method for tracking the position of one or more moving objects based on transmissions from a global navigation satellite system (GNSS), the method comprising:
   collecting GNSS measurement data of satellite signals transmitted from multiple satellites, wherein the GNSS measurement data are collected during motion of the one or more moving objects in a target domain,
   extracting values of a plurality of features from the GNSS measurement data indicative of one or a combination of code and phase values, carrier-to-noise-power-density-ratio, and Doppler shifts of the satellite signals collected in the target domain, such that a statistical distribution of the extracted values of the plurality of features is governed by the target domain;
   mapping the extracted values of the plurality of features from the target domain to a source domain, such that a statistical distribution of the mapped values of the plurality of features resembles a statistical distribution of values of a plurality of training features collected in the source domain, wherein the extracted values of the plurality of features, called the tensor, are mapped using a cycle-consistent Generative Adversarial Network (CGAN) performing a tensor-to-tensor translation of tensors formed by the extracted values of the plurality of features and tensors formed by training features used for training the neural network;
   classifying the mapped values of the plurality of features using a neural network trained with the training features sampled from the source domain to identify the GNSS measurement data affected by multipath; and
   tracking the position of the one or more moving objects by processing the GNSS measurement data based in identified GNSS measurement data affected by multipath.

19. A positioning device for tracking a position of one or more moving objects based on transmissions from a global navigation satellite system (GNSS), the positioning device comprising: a processor; and a memory having instructions stored thereon that, when executed by the processor, cause the positioning device to:
   collect GNSS measurement data of satellite signals transmitted from multiple satellites of the GNSS, wherein the GNSS measurement data are collected during motion of the one or more moving objects in a target domain;
   extract values of a plurality of features from the GNSS measurement data indicative of one or a combination of code and phase values, carrier-to-noise-power-density-ratio, and Doppler shifts of the satellite signals collected in the target domain, such that a statistical distribution of the extracted values of the plurality of features is governed by the target domain;
   map the extracted values of the plurality of features from the target domain to a source domain, such that a statistical distribution of the mapped values of the plurality of features resembles a statistical distribution of values of a plurality of training features collected in the source domain;

classify the mapped values of the plurality of features using a neural network trained with the training features sampled from the source domain to identify the GNSS measurement data affected by multipath, wherein the neural network is trained using a CNN-auto-encoder (CNN-AE) with K-means clustering to classify the mapped plurality of features of the GNSS measurement data, wherein the mapped plurality of features are classified as either one of inlier measurements and outlier measurements, wherein the K-means clustering distinguishes between the inlier measurements and the outlier measurements; and track the position of the one or more moving objects by processing the GNSS measurement data based on the identified GNSS measurement data affected by multipath.

20. A positioning device for tracking a position of one or more moving objects based on transmissions from a global navigation satellite system (GNSS), the positioning device comprising: a processor; and a memory having instructions stored thereon that, when executed by the processor, cause the positioning device to:

collect GNSS measurement data of satellite signals transmitted from multiple satellites of the GNSS, wherein the GNSS measurement data are collected during motion of the one or more moving objects in a target domain;

extract values of a plurality of features from the GNSS measurement data indicative of one or a combination of code and phase values, carrier-to-noise-power-density-ratio, and Doppler shifts of the satellite signals collected in the target domain, such that a statistical distribution of the extracted values of the plurality of features is governed by the target domain;

map the extracted values of the plurality of features from the target domain to a source domain, such that a statistical distribution of the mapped values of the plurality of features resembles a statistical distribution of values of a plurality of training features collected in the source domain;

classify the mapped values of the plurality of features using a neural network trained with the training features sampled from the source domain to identify the GNSS measurement data affected by multipath; and track the position of the one or more moving objects, wherein the position of the one or more moving objects is tracked using a position estimator, wherein the position estimator is a probabilistic filter that comprises a mixed-integer Kalman filter that computes an estimate of receiver states conditioned on the GNSS measurement data that are identified to be not affected by multipath.

* * * * *